(12) United States Patent
Youn et al.

(10) Patent No.: US 8,284,709 B2
(45) Date of Patent: Oct. 9, 2012

(54) METHOD OF CONTROLLING RELAY COMMUNICATION

(75) Inventors: Ae Ran Youn, Gyeonggi-do (KR); Ki Seon Ryu, Seoul (KR); Du Hyun Mun, Seoul (KR); Beom Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 656 days.

(21) Appl. No.: 12/093,128

(22) PCT Filed: Nov. 13, 2006

(86) PCT No.: PCT/KR2006/004740
§ 371 (c)(1),
(2), (4) Date: Nov. 17, 2008

(87) PCT Pub. No.: WO2007/055544
PCT Pub. Date: May 18, 2007

(65) Prior Publication Data
US 2009/0219852 A1    Sep. 3, 2009

(30) Foreign Application Priority Data

Nov. 11, 2005   (KR) .................. 10-2005-0108250
Jan. 16, 2006   (KR) .................. 10-2006-0004357

(51) Int. Cl.
*H04B 7/14*    (2006.01)
(52) U.S. Cl. ........ 370/315; 370/243; 370/244; 370/329; 370/341; 370/400; 370/410; 455/7; 455/445
(58) Field of Classification Search .................. 370/243, 370/244, 315, 328, 329, 341, 400, 410; 455/7, 455/445
See application file for complete search history.

(56) References Cited

U.S. PATENT DOCUMENTS 6,519,449 B1 *   2/2003   Zhang et al. .................... 455/69
7,391,774 B2 *   6/2008   Lim et al. ...................... 370/394
(Continued)

FOREIGN PATENT DOCUMENTS

EP    1503544 A2   2/2005
(Continued)

OTHER PUBLICATIONS

Ren, F.C. et al. "Recommendation on PMP Mode Compatible TDD Frame Structure", IEEE C802.16mmr-05/027r1, [online], Sep. 9, 2005 [retrieved on Jun. 20, 2008].

*Primary Examiner* — Christopher Grey
(74) *Attorney, Agent, or Firm* — Lee, Hong, Degerman, Kang & Waimey

(57) ABSTRACT

A method for reporting a channel status in a mobile communication system including a relay station (RS) is provided. When a mobile terminal in the coverage of a base station (BS) receives a service through an RS, the RS reports a channel status between the RS and the terminal to the BS to allow the BS to decide whether or not to communicate with the terminal through the RS. In the method, a first RS in communication with a BS and at least one terminal measures a channel quality with a first terminal and compares the measured channel quality with a threshold and transmits a report message to the BS according to the comparison. The report message is to request the BS to measure a channel quality of at least one of a second RS and the first terminal in communication with the BS.

5 Claims, 11 Drawing Sheets

U.S. PATENT DOCUMENTS

| | | | |
|---|---|---|---|
| 7,489,668 B2 * | 2/2009 | Cho et al. | 370/338 |
| 7,702,280 B2 * | 4/2010 | Takeda et al. | 455/7 |
| 7,725,109 B2 * | 5/2010 | Kim et al. | 455/450 |
| 2004/0192204 A1 | 9/2004 | Periyalwar et al. | |

FOREIGN PATENT DOCUMENTS

| | | |
|---|---|---|
| JP | 5-136731 | 6/1993 |
| KR | 1020010023402 | 3/2001 |
| KR | 1020030057270 | 7/2003 |
| KR | 10-2004-0044922 | 5/2004 |
| KR | 1020050078640 | 8/2005 |
| KR | 1020050109009 | 11/2005 |
| WO | WO 99/11081 A2 | 3/1999 |
| WO | WO 2005/079027 A1 | 8/2005 |

* cited by examiner

METHOD OF CONTROLLING RELAY COMMUNICATION

CROSS-REFERENCE TO RELATED APPLICATIONS

This application is the National Stage filing under 35 U.S.C. §371 of International Application No. PCT/KR06/04740, filed Nov. 13, 2006, which claims the benefit of earlier filing date and right to priority to Korean Application No. 10-2005-0108250, filed Nov. 11, 2005, and Korean Application No. 10-2006-0004357, filed Jan. 16, 2006.

TECHNICAL FIELD

The present invention relates to a communication method for a communication system including a relay station, and more particularly, to a method in which a relay station (RS) reports a channel status between the RS and a mobile terminal to a base station (BS) in order to allow the BS to decide whether or not to communicate with the terminal through the RS.

BACKGROUND ART

A relay station (RS) has been proposed to increase the cell coverage and the throughput of a mobile communication system. The RS supports an IEEE 802.16e terminal, has some of the functions of a base station (BS), and performs the functions of an active repeater including mobility, RRM, and security functions and a PMP-based RS network entry function. The RS can remove noise by decoding a signal received from a transmitting end and encoding and transmitting it to a receiving end. The RS also functions as a digital amplifier that can achieve a higher throughput using higher data rate coding. However, the RS has a delay problem that may occur in decoding and encoding processes. The RS also has a problem associated with backward compatibility with PMP mode.

The RS is classified into the following types according to mobility.
1. Fixed RS: This RS is permanently fixed to provide services normally in a shadow area and to increase the cell coverage. This RS can perform simple repeater functions.
2. Nomadic RS: This RS is temporarily installed when the number of users is suddenly increased. This RS can be moved arbitrarily inside a building.
3. Mobile RS: This RS can be installed on mass transportation such as buses or subway trains.

Methods for the RS using frequency bands can be divided into the following three methods.
1. First Method: The RS provides services using a new frequency band different from that used by the BS.
2. Second Method: The RS is assigned the same frequency band as that used by the BS and provides services using the assigned frequency band.
3. Third Method: The RS transfers received control signals or data after simple amplification to the BS using the same frequency band as that used by the BS.

FIG. 1 illustrates a network including an RS. The basic purpose of the RS is to increase the service coverage of the BS or to provide services normally by installing it in a shadow area.

FIG. 2 illustrates an example of a conventional frame structure for the RS.

A downlink (DL) relay zone and an uplink (UL) relay zone for the RS are set in the frame. Data that the BS transmits to the RS is allocated as a burst to a downlink zone of the frame and data that the RS transmits to a mobile terminal or station (MS) is allocated to a downlink zone thereof. When the mobile terminal has data to be transmitted to the BS, the mobile terminal transmits the data using a zone allocated to the terminal in the uplink zone of the RS and the RS include the data into a zone allocated to the RS in the uplink.

FIG. 3 illustrates a conventional OFDMA physical layer frame structure.

A downlink sub-frame starts with a preamble that is used for synchronization and equalization in the physical layer. The preamble is followed by a downlink map (DL-MAP) message and an uplink map (UL-MAP) message which define positions and usages of bursts allocated to the downlink and uplink. The overall structure of the frame is defined by the downlink map (DL-MAP) and uplink map (UL-MAP) messages.

The DL-MAP message defines usages of bursts allocated to a downlink zone in a burst mode physical layer and the UL-MAP message defines usages of bursts allocated to an uplink zone. Information elements (IE), which configure the DL-MAP message, include Downlink Interval Usage Codes (DIUCs), Connection IDs (CIDs), and burst position information (a subchannel offset, a symbol offset, the number of subchannels, and the number of symbols), which allow the user to identify the corresponding downlink traffic intervals. On the other hand, each information element of the UL-MAP message specifies the position of a corresponding interval by a duration defined in the information element and specifies its usage by an Uplink Interval Usage Code (UIUC) for each Connection ID (CID). That is, the usages of the intervals of the UL-MAP message are defined by corresponding UIUCs used in the UL-MAP message. The interval of each UL-MAP information element (IE) starts at a position at a distance, corresponding to a duration defined in a previous UL-MAP IE, from the start of the previous UL-MAP IE.

The following is a more detailed description of the UL-MAP message.

The UL-MAP message is used to assign the grant to use an uplink channel. Consecutive IEs that define usages of the uplink intervals are used to define the usages of uplink bursts and to define the usages of uplink resources assigned to them in units of OFDMA symbols and subchannel blocks.

UL-MAP Information Elements (IEs) will now be described.

The UL-MAP IEs specify information regarding band allocation to the uplink. Each UL-MAP message includes at least one IE in order to indicate the end of the last burst. The order of IEs transmitted through the UL-MAP is determined by a physical layer used. The CID assigns the IE to unicast, multicast, and broadcast addresses. A basic CID of the mobile terminal is used as the CID when a bandwidth grant is explicitly set to be assigned. The UIUC is used to specify a usage of the uplink and its associated uplink burst profile. In the case of each UIUC for use in the UL-MAP message, it is necessary that an Uplink_Burst_Profile be included in an Uplink Channel Descriptor (UCD). All the IEs must be supported by terminals. The BS may use any of these IEs when creating a UL-MAP message.

The following Tables 1 to 3 illustrate examples of the DL-MAP message and the UL-MAP message.

TABLE 1

| Syntax | Size | Notes |
|---|---|---|
| DL-MAP_IE( ) { | | |
| DIUC | 4 bits | |
| if (DIUC == 15) { | | |

TABLE 1-continued

| Syntax | Size | Notes |
|---|---|---|
| Extended DIUC dependent IE | variable | See clauses following 8.4.5.3.1 |
| } else { | | |
| if (INC_CID == 1) { | | The DL-MAP starts with INC_CID = 0. INC_CID is toggled between 0 and 1 by the CID-SWITCH_IE( ) (8.4.5.3.7) |
| N_CID | 8 bits | Number of CIDs assigned for this IE |
| for (n=0; n< N_CID; n++) { | | |
| CID | 16 bits | |
| } | | |
| } | | |
| OFDMA Symbol offset | 8 bits | |
| Subchannel offset | 6 bits | |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits | |
| No. Subchannels | 6 bits | |
| Repetition Coding Indication | 2 bits | 0b00 - No repetition coding 0b01 - Repetition coding of 2 used 0b10 - Repetition coding of 4 used 0b11 - Repetition coding of 6 used |
| } | | |
| } | | |

TABLE 2

| Syntax | Size | Notes |
|---|---|---|
| UL-MAP_Message_Format( ) { | | |
| Management Message Type = 3 | 8 bits | |
| reserved | 8 bits | Shall be set to zero. |
| UCD Count | 8 bits | |
| Allocation Start Time | 32 bits | |
| Begin PHY Specific Section { | | See applicable PHY section. |
| if (WirelessMAN-OFDMA) { | | |
| No. OFDMA symbols | 8 bits | Number of OFDMA symbols in the UL subframe |
| } | | |
| for (i= 1; i <= n; i++) { | | For each UL-MAP element 1 to n. |
| UL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

TABLE 3

| Syntax | Size (bits) | Notes |
|---|---|---|
| UL-MAP_IE( ) { | | |
| CID | 16 | |
| UIUC | 4 | |
| if (UIUC == 11) { | | |
| Extended UIUC 2 dependent IE | variable | See subclause 8.4.5.4.4.2 |
| } | | |
| elseif (UIUC == 12) { | | |
| OFDMA symbol offset | 8 | |
| Subchannel offset | 7 | |
| No. OFDMA symbols | 7 | |
| No. subchannels | 7 | |
| Ranging method | 2 | 0b00 - Initial Ranging/Handover Ranging over two symbols 0b01 - Initial Ranging/Handover Ranging over four symbols 0b10 - BW Request/Periodic Ranging over one symbol 0b11 - BW Request/Periodic Ranging over three symbols |
| Dedicated ranging indicator | 1 | 0: the OFDMA region and Ranging Method defined are used for the purpose of normal ranging 1: the OFDMA region and Ranging Method defined are used for the purpose of ranging using dedicated CDMA code and transmission opportunities assigned in the MOB_PAG-ADV message or in the MOB_SCN-RSP message. |
| } else if (UIUC == 13) { | | |
| PAPR_Reduction_and_Safety_Zone_Allocation_IE | 32 | |
| } else if (UIUC == 14) { | | |
| CDMA_Allocation_IE( ) | 32 | |
| } else if (UIUC == 15) { | | |
| Extended UIUC dependent IE | variable | See subclauses following 8.4.5.4.3 |
| } else if (UIUC == 0) { | | |
| FAST-FEEDBACK_Allocation_IE( ) | 32 | |
| } else { | | |
| Duration | 10 | In OFDMA slots (see 8.4.3.1) |
| Repetition coding indication | 2 | 0b00 - No repetition coding 0b01 - Repetition coding of 2 used 0b10 - Repetition coding of 4 used 0b11 - Repetition coding of 6 used |
| if (AAS or AMC UL Zone) { | | AAS/AMC Allocations include absolute slot off-set. |
| Slot offset | 12 | Offset from start of the AAS or AMC zone for this allocation, specified in slots. |
| } | | |
| } | | |
| } | | |

The following is a description of how a CQICH channel and a REP-REQ/RSP MAC management message are used in a conventional method for a BS requesting downlink signal quality information of a mobile terminal in a mobile communication system.

(1) CQICH Channel

In one method in which the BS acquires downlink signal quality information of a mobile terminal, respective subchannels to be used for terminals are set after a specific zone in a two-dimensional uplink map is previously assigned as a dedicated channel zone.

As shown in FIG. 3, a slot is set for each mobile terminal (MS) using a CQICH_Alloc_IE or a CQICH_Enhance_Allocation_IE after a CQICH channel zone is previously assigned using a FAST-FEEDBACK channel in a UL-MAP IE in a UL-MAP message. For example, a first MS (MS#1) can set CQICH#1, a second MS (MS#2) can set CQICH#2 and CQICH#3, and a third MS (MS#3) can set CQICH#4.

The CQICH_Alloc_IE is used to dynamically assign a CQICH to the uplink of the terminal or to cancel the assigned zone. Once a CQICH is assigned, the terminal transmits signal quality information through the assigned CQICH zone with a duration set in the CQICH_Alloc_IE. If the terminal cancels the assigned CQICH, i.e., sets the duration in the CQICH_Alloc_IE to zero, the terminal transmits no signal quality information to the BS.

The following table illustrates an example CQICH_Alloc_IE.

TABLE 4

| Syntax | Size | Notes |
|---|---|---|
| CQICH_Alloc_IE( ) ( ) { | | |
| Extended UIUC | 4 bits | CQICH = 0x03 |
| Length | 4 bits | Length of the message in bytes (variable). |
| CQICH_ID | variable | Index to uniquely identify the CQICH resource assigned to the SS. The size of this field is dependent on system parameter defined in UCD. |
| Allocation offset | 6 bits | Index to the fast feedback channel region marked by UIUC = 0. |
| Period (p) | 2 bits | A CQI feedback is transmitted on the CQICH every $2^p$ frames. |
| Frame offset | 3 bits | The SS starts reporting at the frame of which the number has the same 3 LSB as the specified frame offset. If the current frame is specified, the SS should start reporting in eight frames |
| Duration (d) | 3 bits | A CQI feedback is transmitted on the CQI channels indexed by the CQICH_ID for 10 × 2 dframes. If d == 0, the CQICH is deallocated. If d == 0b111, the SS should report until the BS command for the SS to stop. |

TABLE 4-continued

| Syntax | Size | Notes |
|---|---|---|
| Report configuration included | 1 bits | Update to CINR report configuration is included. |
| If (report configuration included == 1) { | | |
| Feedback Type | 2 bits | 0b00 = physical CINR feedback<br>0b01 = effective CINR feedback<br>0b10-0b11 = Reserved |
| Report type | 1 bit | 0: Report for preamble<br>1: Report for specific permutation zone |
| If (Report type == 0) { | | |
| CINR preamble report type | 1 bit | The type of preamble-based CINR report<br>0 - Frequency reuse factor = 1 configuration.<br>1 - Frequency reuse factor = 3 configuration. |
| } | | |
| Else { | | report for permutation zone. |
| Zone permutation | 3 bits | The type of zone for which to report 0b000 - PUSC with 'use all SC = 0'<br>0b001 - PUSC with 'use all SC = 1'<br>0b010 - FUSC<br>0b011 - Optional FUSC<br>0b100 - Safety Channel region 0b101 - AMC zone (only applicable to AAS mode) 0b110-111 - Reserved |
| Zone type | 2 bits | 0b00 - non-STC zone 0b01- STC zone<br>0b10 - AAS zone<br>0b11 - reserved |
| Zone PRBS_ID | 2 bits | The PRBS_ID of the zone on which to report |
| If (Zone type == 0b000 or 0b001) { | | |
| Major group indication | 1 bit | If '0' then the report may refer to any subchannel in the PUSC zone. |
| If (Major group indication == 1) { | | |
| PUSC Major group bitmap | 6 bits | Reported CINR shall only apply to the subchannels of PUSC major groups for which the corresponding bit is set.<br>Bit #k refers to major group k. |
| } | | |
| } | | |
| CINR zone measurement type | 1 bit | 0: measurement from pilot subcarriers and, if AAS zone, from AAS preamble.<br>1: measurement from data subcarriers |
| } | | |
| If (feedback type == 0b00) { | | Physical CINR feedback |
| Averaging parameter included | 1 bit | |
| If (Averaging parameter included == 1) { | | |
| Averaging parameter | 4 bits | Averaging parameter used for deriving physical CINR estimates reported through CQICH. This value is given in multiples of |

TABLE 4-continued

| Syntax | Size | Notes |
|---|---|---|
| | | 1/16 in the range of [1/16 . . . 16/16] in increasing order. $a_{avg}$ |
| } } } | | |
| MIMO_permutation_feedback_cycle | 2 bits | 0b00 = No MIMO and permutation mode feedback<br>0b01 = The MIMO and permutation mode indication shall be transmitted on the CQICH indexed by the CQICH_ID every four allocated CQICH transmission opportunity. The first indication is sent on the fourth allocated CQICH frame transmission opportunity.<br>0b10 = The MIMO mode and permutation mode indication shall be transmitted on the CQICH indexed by the CQICH_ID every eight allocated CQICH transmission opportunity. The first indication is sent on the eighth allocated CQICH trans-mission opportunity.<br>0b11 = The MIMO mode and permutation mode indication shall be transmitted on the CQICH indexed by the CQICH_ID every 16 allocated CQICH transmission opportunity. The first indication is sent on the 16th allocated CQICH transmission opportunity. |
| Padding | variable | Number of bits required to align to byte length, shall be set to zero. |
| } | | |

(2) REP-REQ/RSP MAC Message

A. REP-REQ (Channel Measurement Report Request)

This message is used when a BS that operates in a band of 11 GHz or less requests downlink channel measurement results such as RSSI and CINR information of a mobile terminal.

The following table illustrates an example report request (REP-REQ) message format.

TABLE 5A

| Syntax | Size | Notes |
|---|---|---|
| Report_Request_Message_Format ( ) { | | |
| Management Message Type = 36 | 8 bits | |
| Report Request TLVs | variable | |
| } | | |

The following tables illustrate TLV-encoded parameters of the REP-REQ message.

TABLE 5B

| Name | Type | Length | Value |
|---|---|---|---|
| Report request | 1 | variable | Compound |

A signal quality information report response message needs to be used to respond to a list of report request channel measurements received by the mobile terminal.

TABLE 5C

| Name | Type | Length | Value |
|---|---|---|---|
| Report type | 1.1 | 1 | Bit #0 = 1 Include DFS Basic report<br>Bit #1 = 1 Include CINR report<br>Bit #2 = 1 Include RSSI report<br>Bit #3-6 $a_{avg}$\in multiples of 1/32 (range [1/32, 16/32])<br>Bit #7 = 1 Include current transmit power report |
| Channel number | 1.2 | 1 | Physical channel number (see 8.5.1) to be reported on. (license-exempt bands only) |
| Channel Type request | 1.3 | 1 | 0b00 = Normal subchannel,<br>0b01 = Band AMC Channel,<br>0b10 = Safety Channel,<br>0b11 = Sounding |
| Zone-specific physical CINR request | 1.4 | 3 | Bits #0-2: Type of zone on which CINR is to be reported<br>0b000: PUSC zone with 'use all SC = 0'<br>0b001: PUSC zone with 'use all SC = 1'/PUSC AAS zone<br>0b010: FUSC zone<br>0b011: Optional FUSC zone<br>0b100: Safety Channel region<br>0b101: AMC zone (only applicable to AAS mode)<br>0b110-0b111: Reserved<br>Bit #3: 1 if zone for which CINR should be estimated is STC zone, 0 otherwise.<br>Bit #4: 1 if zone for which CINR should be estimated is AAS zone, 0 otherwise.<br>Bits #5-6: PRBS_ID of the zone for which CINR should be estimated. Ignored for Safety Channel.<br>Bit #7: Data/pilot-based CINR measurement:<br>0 - Report the CINR estimate from pilot subcarriers,<br>1 - Report the CINR estimate from data subcarriers<br>Bits #8-13: Reported CINR shall only be estimated for the subchannels of PUSC major groups for which the corresponding bit is set. Bit # (k + 7) refers to major group k. Only applicable for CINR measurement on a PUSC zone<br>Bits #14-17: $a_{avg}$ in multiples of 1/16 (range is [1/16, 16/16])<br>Bit #18: 0 - report only mean of CINR<br>1 - report both mean and standard deviation of CINR<br>Bits #19-23: Reserved, shall be set to zero |

TABLE 5C-continued

| Name | Type | Length | Value |
|---|---|---|---|
| Preamble physical CINR request | 1.5 | 1 | Bits #0-1: Type of preamble physical CINR measurement<br>0b00 - Report the estimation of CINR measured from preamble for frequency reuse configuration = 1<br>0b01 - Report the estimation of CINR measured from preamble for frequency reuse configuration = 3<br>0b10 - Report the estimation of CINR measured from preamble for band AMC<br>0b11 - Reserved<br>Bits #2-5: in multiples of 1/16 (range is [1/16, 16/16]) Bit #6: 0 - report only mean of CINR 1 - report both mean and standard deviation of CINR<br>Bit #7: Reserved, shall be set to zero $a_{avg}$ |
| Zone-specific effective CINR request | 1.6 | 2 | Bits #0-2: Type of zone on which effective CINR is to be reported<br>0b000: PUSC zone with 'use all SC = 0'<br>0b001: PUSC zone with 'use all SC = 1'/PUSC AAS zone<br>0b010: FUSC zone<br>0b011: Optional FUSC zone<br>0b100: Reserved<br>0b101: AMC zone (only applicable to AAS mode)<br>0b110 - 0b111: Reserved<br>Bit #3: 1 if zone for which effective CINR should be reported is STC zone, 0 otherwise.<br>Bit #4: 1 if zone for which effective CINR should be estimated is AAS zone, 0 otherwise.<br>Bits #5-6: PRBS_ID of the zone for which effective CINR should be reported. Ignored for Safety Channel. Bit #7: Data/pilot-based effective CINR measurement: 0 - Report the CINR estimate from pilot subcarriers, 1 - Report the CINR estimate from data subcarriers<br>Bits #8-13: Reported effective CINR shall only be estimated for the subchannels of PUSC major groups for which the corresponding bit is set. Bit # (k + 7) refers to major group k. Only applicable for CINR measurement on a PUSC zone<br>Bit #14-15: Reserved, shall be set to zero |
| Preamble effective CINR request | 1.7 | 1 | Bits #0-1: Type of preamble-based effective CINR measurement<br>0b00 - Report the estimation of effective CINR measured from preamble for frequency reuse configuration = 1<br>0b01 - Report the estimation of effective CINR measured from preamble for frequency reuse configuration = 3<br>0b10-11 - Reserved<br>Bit #2-7: Reserved, shall be set to zero |
| Channel selectivity report | 1.8 | 1 | Bit #0: 1 - include frequency selectivity report<br>Bit #1-7: Reserved, shall be set to zero |

B. REP-RSP (Channel Measurement Report Response)

The mobile terminal uses this message in order to respond to channel measurements listed in a received report request. The terminal transmits a channel measurement report response message including measurement results of channels listed in a received channel measurement report request. The reported channel quality type is determined according to the type of a channel currently used for communication with the BS. The following Table 6A illustrates a channel measurement report response message format.

TABLE 6A

| Syntax | Size | Notes |
|---|---|---|
| Report_Response_Message_Format { | | |
| Management Message Type = 37 | 8 bits | |
| Report Response TLVs } | variable | |

| Name | Type | Length | Value |
|---|---|---|---|
| Report | 1 | variable | Compound |
| Channel Type Report in WirelessMAN OFDMA PHY | 2 | variable | Compound |
| Current transmitted power | 147 | 1 | See 8.3.7.4 and 11.1.1 |

A report of channel types and information reported through the channel measurement report response message include parameters as shown in the following Table 6B.

TABLE 6B

| | Name | Type | Length | Value |
|---|---|---|---|---|
| REP-REQ Report type | | | | |
| bit #0 = 1 | Channel number | 1.1 | 1 | Physical channel number (see 8.5.1) to be reported on |
| bit #0 = 1 | Start frame | 1.2 | 2 | 16 LSBs of Frame number in which measurement for this channel started |
| bit #0 = 1 | Duration | 1.3 | 3 | Cumulative measurement duration on the channel in multiples of Ts. For any value exceeding 0xFFFFFF, report 0xFFFFFF |

TABLE 6B-continued

| Name | Type | Length | Value |
|---|---|---|---|
| bit #0 = 1 | Basic report | 1.4 | 1 | Bit #0: WirelessHUMAN detected on the channel<br>Bit #1: Unknown transmissions detected on the channel<br>Bit #2: Specific Spectrum User detected on the channel<br>Bit #3: Unmeasured. Channel not measured |
| bit #1 = 1 | CINR report | 1.5 | 2 | 1 byte: mean (see also 8.2.2, 8.3.9, 8.4.11) for details) 1 byte: standard deviation |
| bit #2- 1 | RSSI report | 1.6 | 2 | 1 byte: mean (see also 8.2.2, 8.3.9, 8.4.11) for details) 1 byte: standard deviation |
| REP-REQ Channel Type request (binary) | | | | |
| 01 | Band AMC Report (CQI value) | 2.2 | 5 | First 12 bits for the band indicating bitmap and next 20 bits for CINR measurement (5 bits per each band) |
| 11 | Sounding Report | 2.5 | 1 | Average SINR. 8 bits in the same format used in 8.4.11.3 |

The RS described above in the conventional technologies can be fixedly installed between a base station (BS) and a terminal. The conventional RS also can be installed on a moving vehicle to increase the service coverage of the BS or to reduce shadow areas.

However, there is no conventional technology which suggests a method for deciding when to perform direct communication between the BS and the terminal and when to perform relay communication through the RS.

The conventional communication system provides a method in which the BS receives, directly from a mobile terminal, signal quality information of downlink/uplink channels between the BS and the mobile terminal. According to this signal quality information of downlink/uplink channels, MS performs handover.

However, no conventional communication technologies provide a method for the communication system including the RS in which the terminal, the RS, and the BS can communicate with each other according to changes of status of radio channel.

DISCLOSURE OF INVENTION

An object of the present invention devised to solve the problems lies on providing a method in which a BS decides whether to perform direct communication or relay communication with a terminal and controls the communication in a broadband wireless access system.

It is another object of the present invention to provide a method for controlling data communication between the RS, the terminal, and the BS according to changes in communication environments in the communication system including the RS.

The object of the present invention can be achieved by providing a relay communication control method applied to a broadband wireless access system including a relay station, the method comprising obtaining information regarding a channel status between a base station and a terminal; obtaining information regarding a channel status between the relay station and the terminal if it is determined, by checking the information regarding the channel status between the base station and the terminal, that a specified condition is satisfied; comparing the channel status between the base station and the terminal with the channel status between the relay station and the terminal; and performing direct communication or relay communication between the base station and the terminal, according to the comparison.

In another aspect of the present invention, provided herein is a relay communication control method applied to a broadband wireless access system including a relay station, the method comprising periodically obtaining information regarding a channel status between a base station and a terminal and information regarding a channel status between the relay station and the terminal; comparing the channel status between the base station and the terminal with the channel status between the relay station and the terminal; and performing direct communication or relay communication between the base station and the terminal, according to the comparison.

The present invention relates to a terminal that communicates with a BS through an RS. The present invention provides a method for the RS reporting to the BS when information regarding uplink/downlink signal quality between the RS and the terminal is reduced. In the description of the present invention, the term "signal quality information" refers to information (or value) regarding the signal quality such as CINR or RSSI information (or value). The present invention also provides a mechanism ensuring that, when a terminal in the coverage of the BS receives a service from the BS through the RS, the RS reports a channel status between the RS and the terminal to the BS. The present invention also provides a method for relaying a service, which has been relayed through a first specific RS, through a second specific RS.

In another aspect of the present invention, provided herein is a method for reporting a channel status in a communication system including at least one relay station including a first relay station communicating with a base station and at least one terminal, the method comprising the first relay station measuring a channel quality with a first terminal; and comparing the measured channel quality with a threshold and transmitting a report message to the base station according to the comparison, wherein the report message is a message requesting the base station to measure a channel quality of at least one of a second relay station and the first terminal in communication with the base station.

In a further aspect of the present invention, provided herein is a method for reporting a channel status in a communication system including a base station communicating with at least one of one or more terminals and one or more relay stations, the method comprising the base station receiving a report message requesting channel quality measurement from a first relay station that performs relaying for a first terminal; and measuring a channel quality of at least one of the first terminal and a second relay station according to the report message.

In another aspect of the present invention, provided herein is a method for reporting a channel status in a communication system including one or more relay stations and at least one base station, the method comprising a terminal in communication with the communication system transmitting data to a first relay station; and receiving data transmitted through a data path selected according to a channel quality measured by the transmitted data, wherein the data path is determined based on comparison of the measured channel quality with a channel quality between the terminal and one of the base station and a second relay station.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
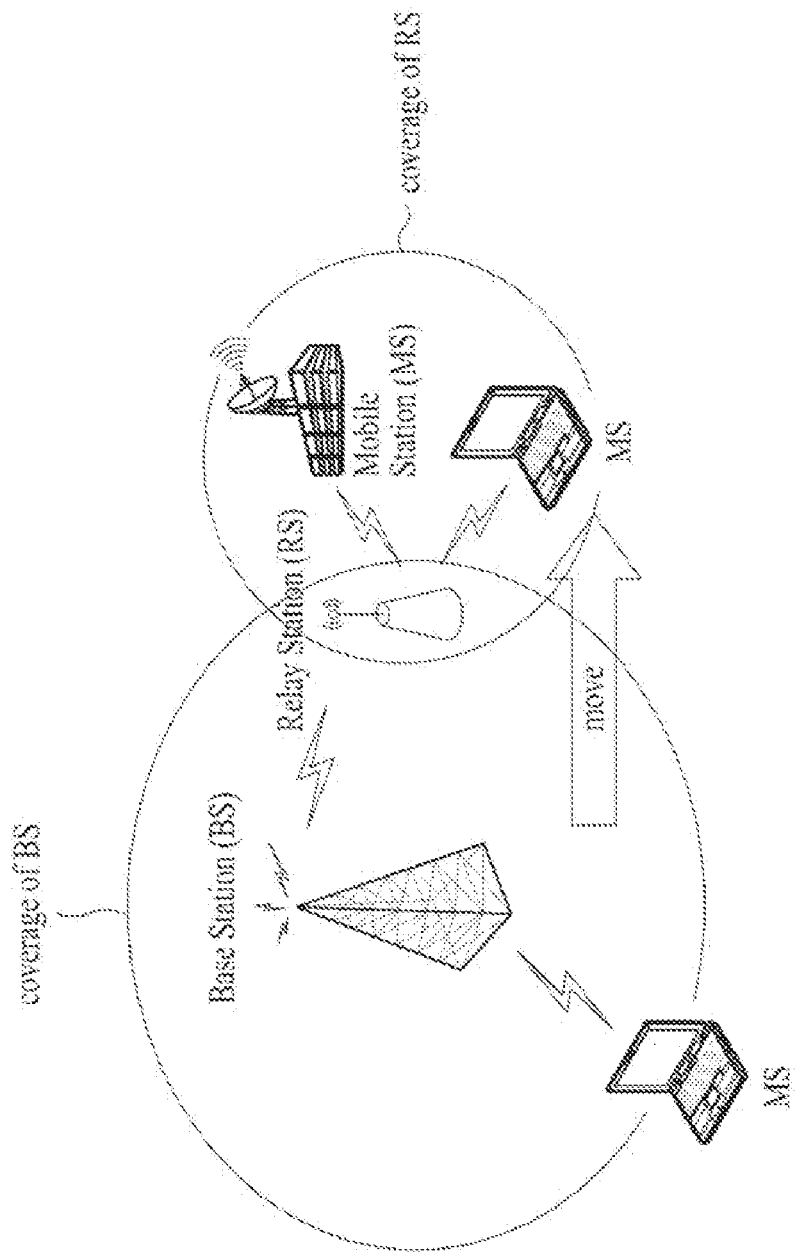
FIG. 1 illustrates a network including an RS.
Figure 2:
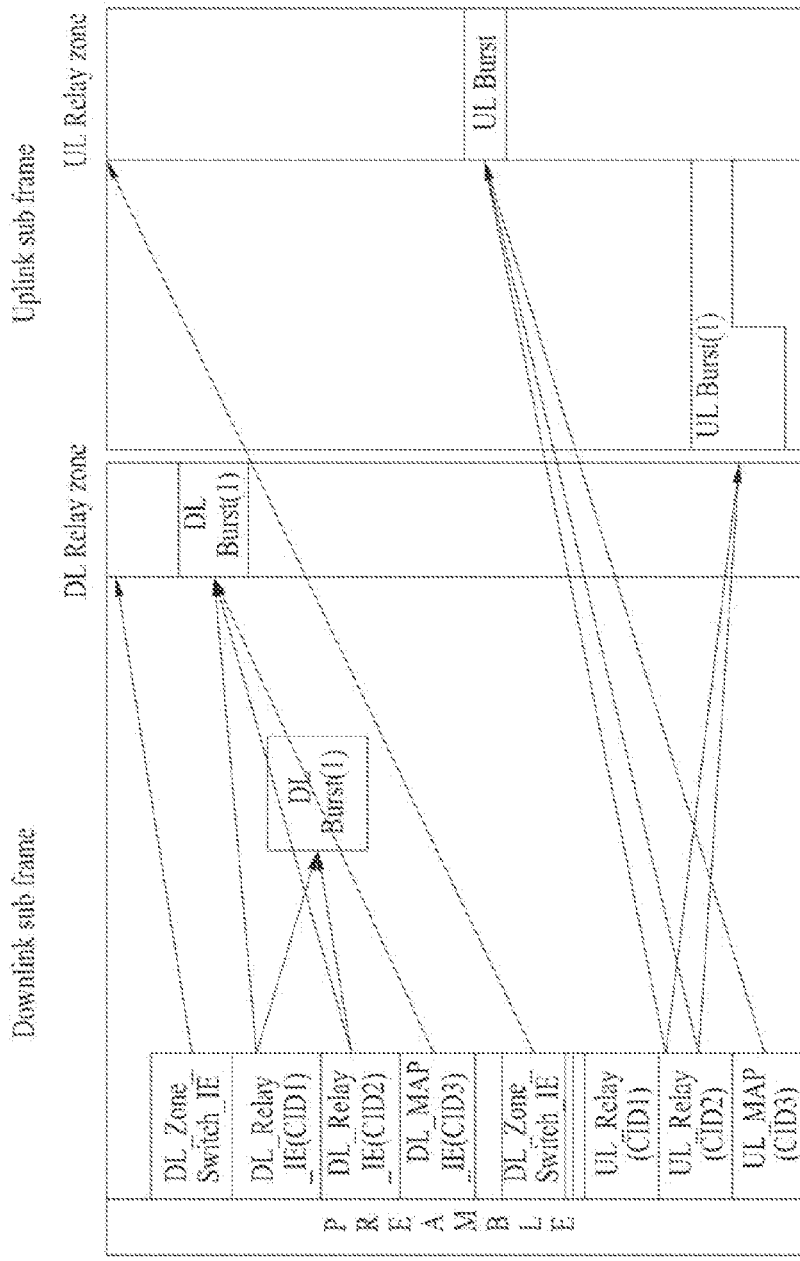
FIG. 2 illustrates an example of a conventional frame structure for the RS.
Figure 3:
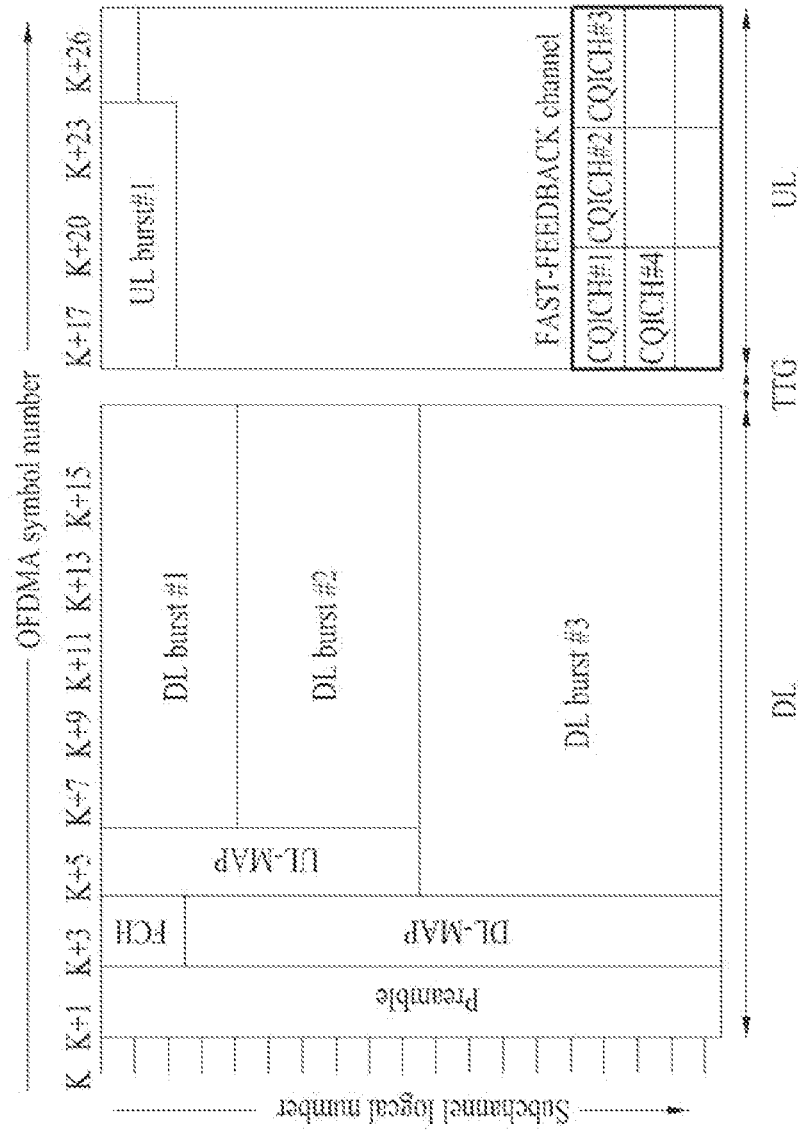
FIG. 3 illustrates an example of a conventional OFDMA physical layer frame structure.

The above and other objects, features, and advantages of the invention will be more clearly understood from the following detailed description of the preferred embodiments of the present invention.

A method for controlling communication through an RS according to a first embodiment of the present invention will now be described.

First Embodiment

A base station (BS) compares an uplink signal quality between the BS and a terminal with an uplink signal quality of signals received by the BS through a relay station (RS) and decides whether to perform direct communication with the terminal or to allow the RS to relay signals communicated between the BS and the terminal. If the BS determines that it is necessary to increase the throughput, the BS attempts to relay signals for the terminal through the RS.

In order to obtain uplink signal quality information of the terminal, the BS causes the terminal to transmit signal quality information periodically or when a specific condition is satisfied.

The terminal can use a specific channel or a MAC message to transmit signal quality information periodically or when a specific condition is satisfied. For example, the specific channel includes a CQICH and the MAC message includes a REP-REQ/RSP MAC management message.

The following is a description of a procedure in which, while a BS and a terminal communicate directly with each other, an RS starts to relay signals communicated between the BS and the terminal.

If, while receiving a service from a BS, a terminal moves to the coverage of an RS or moves away from the BS so that an uplink signal quality of the terminal received by the BS is lowered or if the BS attempts to increase the throughput of communication with the terminal through the RS, the BS checks uplink signal quality information between the terminal and the BS. In particular, the BS compares the uplink signal quality information with uplink signal quality information obtained when an RS is present between the BS and the terminal. If the signal quality or the throughput with the RS is higher than the uplink signal quality without involving the RS, the BS provides a service to the terminal through the RS.

Examples of a method in which the BS obtains signal quality information which is received by the RS are described as follows. The Method relates to a CQICH and a REP-REQ/RSP MAC management message.

The terminal which is present in the coverage of the BS can receive services from the BS through the RS. Uplink signal quality information between the terminal and the RS can be transmitted to the BS periodically or when a specific condition is satisfied.

First, a method for transmitting signal quality information through a CQICH when a specific condition is satisfied is described below.

A BS can allocates a CQICH for a terminal to an uplink and request downlink signal quality information from the terminal. If a measured value of the downlink signal quality information transmitted from the terminal to the BS or an uplink signal quality which is measured by the BS is less than a reference value, the BS requests the terminal to transmit downlink signal quality information via the CQICH channel. The BS can measure the uplink signal quality using the measured value of the downlink signal quality information transmitted from the terminal.

In addition, the BS sets the RS to monitor an uplink from the terminal and the RS, which has obtained uplink signal quality information of the terminal, requests the BS to allocate a CQICH zone. Specifically, if the terminal transmits downlink signal quality information through a CQICH zone, the RS receives the information from the terminal and checks uplink signal quality information between the terminal and the RS. Then, the RS transmits the uplink signal quality information between the terminal and the RS through the CQICH zone corresponding to the terminal which the BS has allocated. If the uplink signal quality information transmitted for the RS and the uplink signal quality information obtained by the RS are higher than signal quality information received directly from the terminal and higher than a reference value, the BS provides a service to the terminal through the RS.

Figure 4:
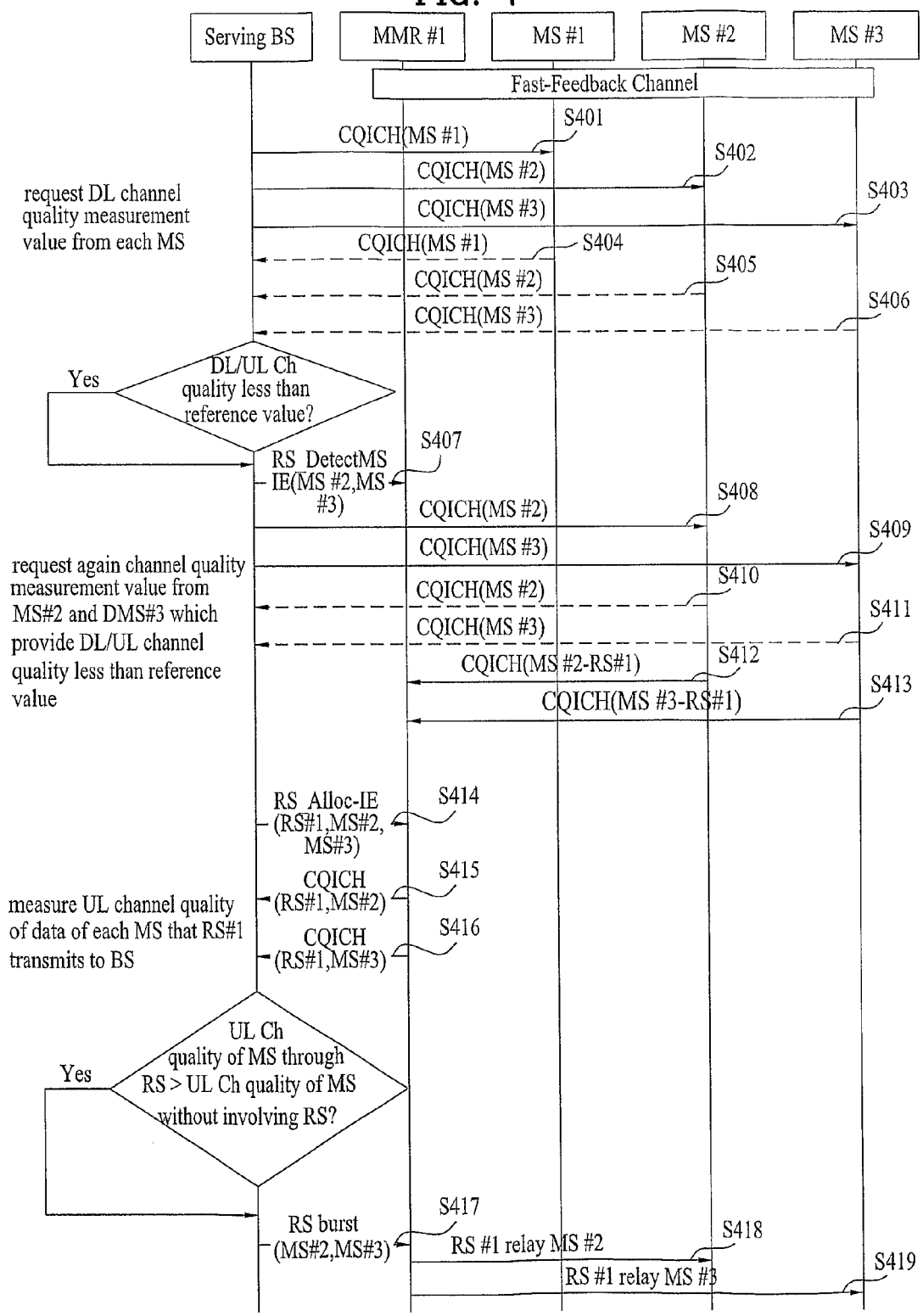
FIG. 4 is a flow chart of a method for deciding whether to perform direct communication or relay communication.

FIG. 4 is a flow chart of an embodiment of a method for deciding whether to perform direct communication or relay communication.

As shown in FIG. 4, a base station (BS) allocates a CQICH to a first terminal or mobile station (MS), a second terminal, and a third terminal and requests downlink signal quality information from the terminals (S401-S403). The BS receives signal quality information from the terminals (S404-S406) and determines, using the received information, whether or not the received quality of each of the terminals is less than a reference value.

If the received quality of any of the second and third terminals is less than the reference value, the base station requests an RS to monitor an uplink of the corresponding terminal (S408-S409). Each of the second and third terminals transmits signal quality information through a corresponding CQICH (S410-S413). Then, if the RS obtains the signal quality information transmitted from the second and third terminals and radio resources are allocated by the BS to transmit signal quality information (S414), the RS transmits uplink signal quality information of each of the second and third terminals through a CQICH zone (S415-S416). If uplink signal quality information received through the RS and uplink signal quality information obtained by RS are higher than uplink signal quality information received directly from each of the first and second terminals, the BS performs relay communication with the second and third terminals through the RS (S417-S419).

The following is a description of a method for transmitting signal quality information using a MAC management message when a specific condition is satisfied.

If downlink signal quality information transmitted from a terminal to a BS or uplink signal quality information, measured by the downlink signal quality information which is received by the BS, is less than a reference value, the BS allocates radio uplink resources to the terminal. The BS also transmits a message requesting the RS to monitor the uplink signal quality of the terminal. If each terminal to which the BS has allocated radio uplink resources has data to transmit to the BS, the terminal transmits the data. If the terminal has no data to be transmitted to the BS, the terminal performs periodic ranging.

If the terminal transmits data, the RS transmits uplink signal quality information of the data received from the terminal using radio resources which the BS has allocated to the RS. When the terminal performs periodic ranging, the terminal transmits a ranging request message to the BS through the RS. Through the ranging request message, the RS can obtain uplink signal quality information from the terminal. The RS can transmit the uplink signal quality information of the terminal, which the RS has obtained, through a MAC message to the BS. The BS compares the uplink signal quality information transmitted by the RS with uplink signal quality information received directly from the terminal and decides whether to perform direct communication or relay communication with the terminal.

Figure 5:
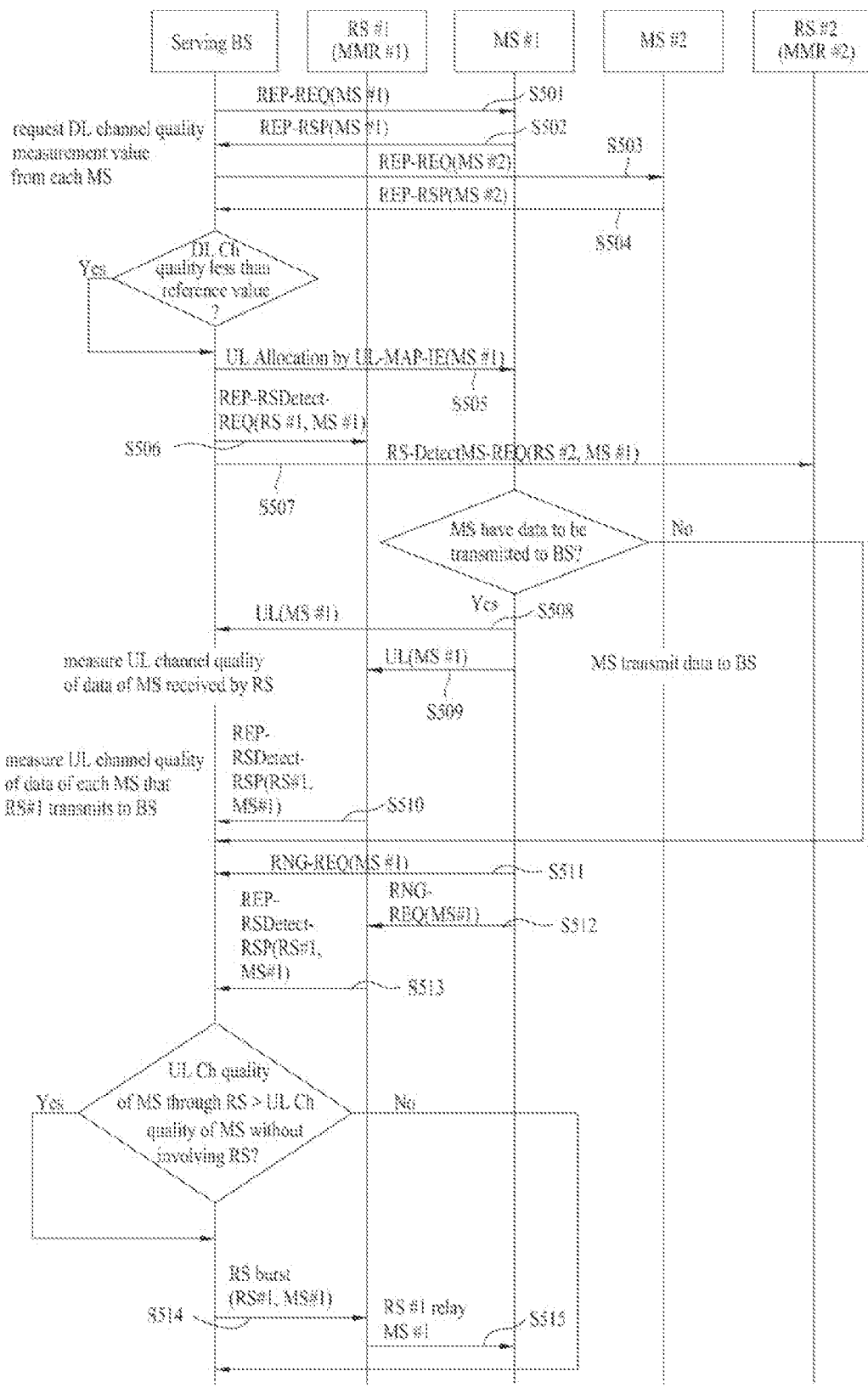
FIG. 5 is a flow chart of a method for deciding whether to perform direct communication or relay communication.

FIG. 5 is a flow chart of an embodiment of a method for deciding whether to perform direct communication or relay communication. As shown in FIG. 5, if a BS requests downlink signal quality information from each of first and second terminals through a REP-REQ message (S501, S503), then each of the terminals transmits downlink signal quality information to the BS through a REP-RSP message (S502, S504). The BS checks the received downlink signal quality of each of the terminals and/or an uplink signal quality measured by the REP-RSP. If the downlink signal quality and/or the uplink signal quality is less than a reference value, the BS allocates radio uplink resources of the corresponding terminal (the first terminal in the example of FIG. 5) (S505). The BS then requests each RS to monitor an uplink between the corresponding terminal and the RS (S506, S507).

The terminal (the first terminal in the example of FIG. 5), to which the BS has allocated an uplink radio resources, checks whether or not it has data to be transmitted to the BS. If the terminal has data to be transmitted, the terminal transmits the data through the allocated radio uplink resources (S508). If the terminal transmits data to the base station, the RS (the first RS in the example of FIG. 5) transmits uplink signal quality information of the data received from the terminal to the BS by incorporating the uplink signal quality information into a MAC message. If it has no data to be transmitted to the BS, the terminal performs periodic ranging. Specifically, the terminal transmits a ranging request message to the BS and the RS (S511, S512). The RS can receive the uplink signal quality through the ranging request message received from the terminal. The RS transmits signal quality information between the RS and the terminal to the BS through a MAC message signal quality report response message (REP-RSDetect-RSP) (S513).

The BS compares uplink signal quality information, measured by the signal quality report response message (REP-REDetect-RSP), and/or the uplink signal quality information of the terminal, which the RS has obtained and transmitted to the BS, with uplink signal quality information received directly from the terminal. If the uplink signal quality information of the terminal received through the RS is higher than the uplink signal quality information received directly from the terminal and higher than a reference value, the BS provides services to the terminal through the RS (the first RS in the example of FIG. 5) (S514, S515).

The BS can cause the RS to periodically report uplink signal quality information between the terminal and the RS to the BS. The BS also decides, using the reported information, whether to perform direct communication or relay communication.

First, a method for receiving signal quality information through a CQICH is described below.

The BS allocates a CQICH for a terminal to the uplink and periodically checks downlink signal quality information which the terminal has transmitted to the BS, or uplink signal quality information of this downlink information. Specifically, the BS requests the terminal to transmit downlink signal quality information via the CQICH and sets the RS to monitor an uplink from the terminal during a corresponding period. Upon receiving the uplink signal quality information of the terminal, the RS requests the BS to allocate a CQICH zone. If each terminal transmits downlink signal quality information through a CQICH zone, the RS receives the information and checks uplink signal quality information and then transmits the signal quality information between the terminal and the RS through a CQICH zone of the corresponding terminal.

The BS compares the two signal quality information values between the terminal and the RS with the directly received signal quality information. If the uplink signal quality information received through the RS is higher than the directly received signal quality information and higher than a reference value, the BS provides services to the terminal through the RS. This procedure is repeated during the corresponding period. If the period is completed or if the CQICH is de-allocated, then the procedures are canceled.

Figure 6:
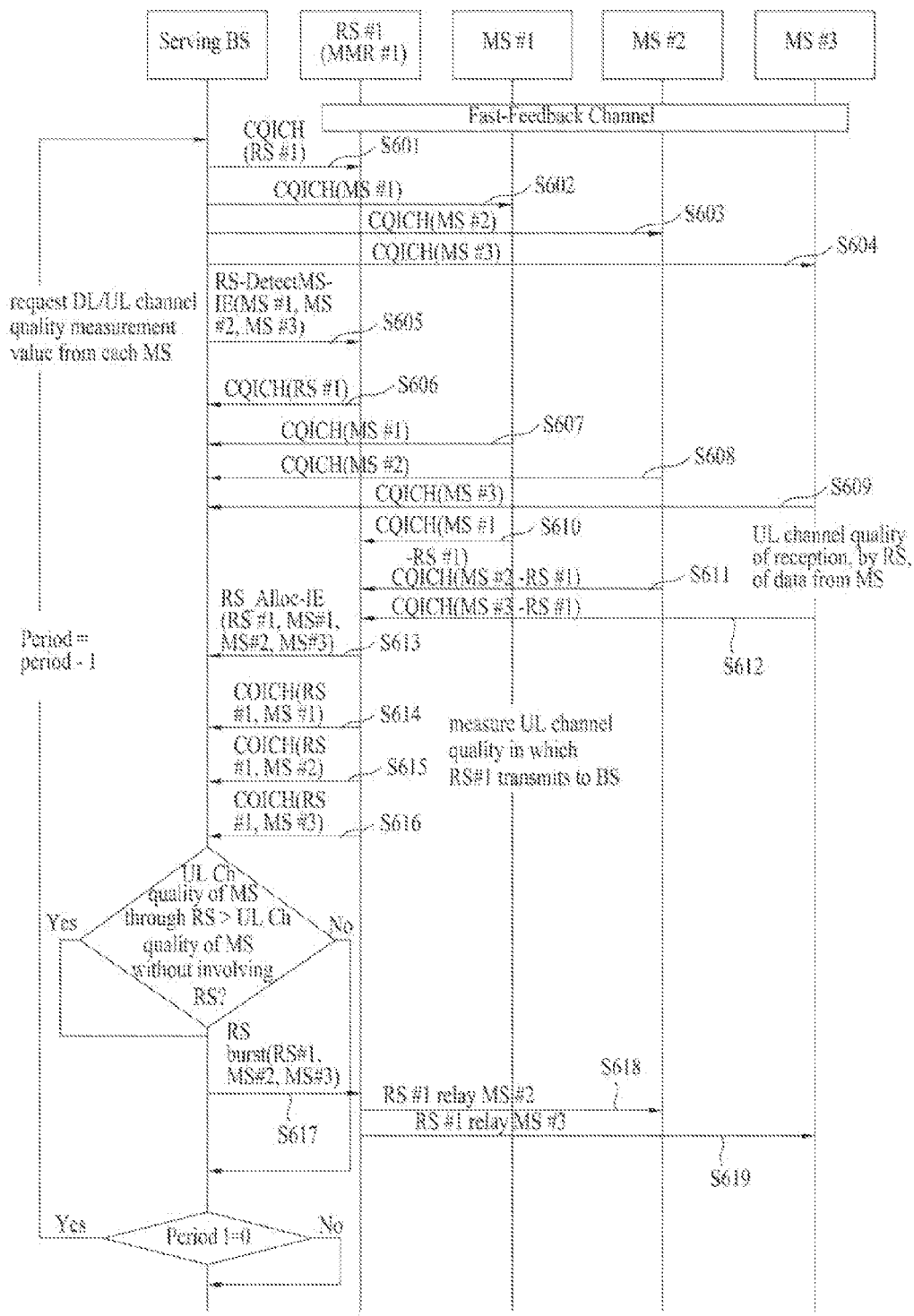
FIG. 6 is a flow chart of a method for deciding whether to perform direct communication or relay communication.

FIG. 6 is a flow chart of an embodiment of a method for deciding whether to perform direct communication or relay communication.

As shown in FIG. 6, a BS allocates respective areas for a first RS, a first terminal, a second terminal, and a third terminal in a Fast-Feedback channel zone. The BS then requests downlink signal quality information of the first RS, the first terminal, the second terminal, and the third terminal (S601-S604). The BS requests the first RS to monitor uplink signal quality information received from the first terminal, the second terminal, and the third terminal (S605). Each of the first terminal, the second terminal, and the third terminal transmits the signal quality information through the corresponding CQICH (S606-S612).

In order to obtain uplink signal quality information of each terminal, which the first RS has obtained, the BS allocates a CQICH of the first RS (S613). The first RS transmits the respective uplink quality information of the first terminal, the second terminal, and the third terminal, which the first RS has obtained, through the allocated CQICH areas of the first RS (S614-S616).

If the uplink signal quality information received through the first RS and/or the uplink signal quality information of a terminal, which the first RS has obtained, is higher than uplink signal quality information received directly from the terminal and is also higher than a reference value, the BS performs relay communication with the terminal through the RS (S617-S619).

A method for periodically receiving signal quality information using a MAC message will now be described.

To obtain the uplink signal quality information of a terminal, a BS periodically allocates uplink radio resources to the terminal and transmits a MAC message to an RS to request to monitor the uplink of the terminal. If each terminal, to which the BS has assigned an uplink, has data to be transmitted to the BS, the terminal transmits the data and, if the terminal has no data to be transmitted to the BS, the terminal performs periodic ranging.

If the terminal transmits data to the BS, the RS transmits uplink signal quality information of the data obtained from the terminal via allocated radio resources. When the terminal performs periodic ranging, the terminal transmits a ranging request message to the BS through the RS. Through the ranging request message, the RS can receive uplink signal quality information from the terminal. The RS transmits the uplink signal quality information of the terminal, which the RS has received, via a MAC message to the BS. Upon receiving data from the RS, the BS compares uplink signal quality information of the reception of this data and/or uplink signal quality information between the RS and the terminal transmitted from the RS with uplink signal quality information received directly from the terminal. If the uplink signal quality information of the terminal received through the RS is higher than the uplink signal quality information received directly from the terminal, the BS provides services to the terminal through the RS.

Figure 7:
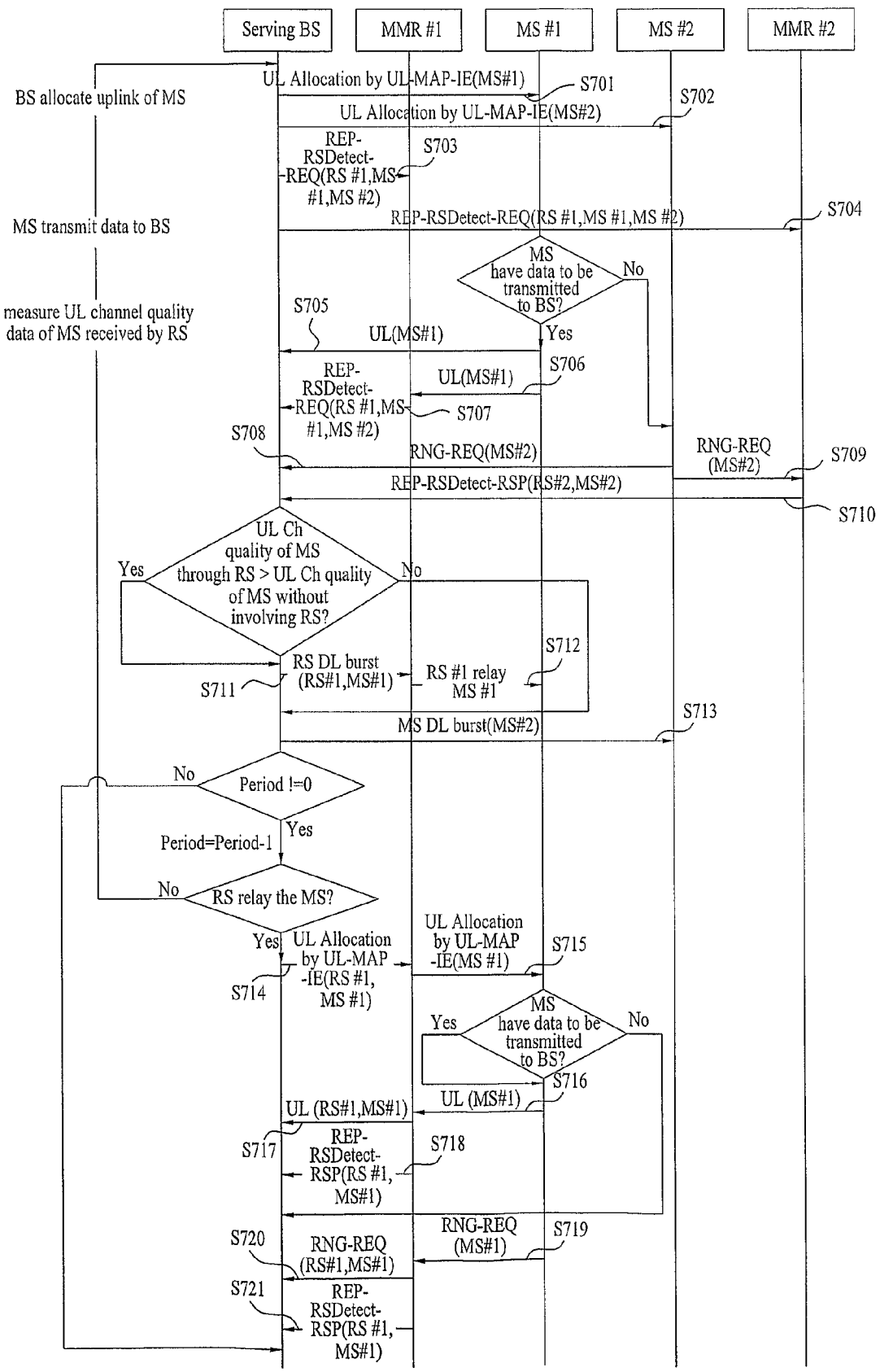
FIG. 7 is a flow chart of a method for deciding whether to perform direct communication or relay communication.

FIG. 7 is a flow chart of an embodiment of a method for deciding whether to perform direct communication or relay communication. A BS allocates respective radio uplink resources to first and second terminals (S701, S702) The BS transmits a signal quality detection report request message (REP-RSDetect-REQ) to first and second RSs to allow the first and second RSs to monitor respective uplinks from the first and second terminals (S703, S704).

If the first terminal, to which the BS has allocated radio uplink resources, has data to be transmitted to the BS, the first terminal transmits the data using the allocated radio uplink resources (S705, S706). If the first terminal transmits the data to the BS, the RS checks an uplink signal quality of the data obtained from the terminal and transmits the signal quality information to the BS through a signal quality detection report response message (REP-RSDetect-RSP) (S707).

If the second terminal has no data to be transmitted to the BS, the second terminal performs periodic ranging. Specifically, the second terminal transmits a ranging request message (RNG-REQ) (S708, S709). The second RS can confirm uplink signal quality information from the ranging request message (RNG-REQ) obtained from the second terminal. The second RS transmits the received uplink signal quality information of the terminal via a signal quality detection report response message (REP-RSDetect-RSP) to the BS (S710). Using the received information, the BS determines whether or not the signal quality when the BS performs direct communication with the terminal is higher than the signal quality when the BS performs relay communication with the terminal using the RS. If it is determined that the signal quality of the direct communication is higher than the signal quality of the relay communication, the BS performs direct communication with the terminal. On the other hand, if it is determined that the signal quality of the direct communication is lower than the signal quality of the relay communication, the BS performs relay communication with the terminal using the RS.

The BS provides a service to the terminal through the RS (S711, S712). If uplink signal quality information of the terminal received through the RS is higher than uplink signal quality information received directly from the terminal, the BS performs communication with the terminal without involving the RS (S713).

If a period for receiving the uplink signal quality information the is nonzero and the BS provides a service to the terminal through the RS, the BS allocates an uplink resources to the terminal through the RS and, if the terminal has data to be transmitted to the BS, the terminal transmits the data via the allocated resources (S714-S717). If the first terminal transmits data to the BS, the first RS checks uplink signal quality information of the data received from the terminal and transmits the uplink signal quality information to the BS via a REP-RSDetect-RSP message which is response to the REP-RSDetect-REQ message (S718).

If the first terminal has no data to be transmitted to the BS, the first terminal performs periodic ranging. When the first terminal performs periodic ranging, the first terminal transmits a RNG-REQ message to the BS through the first RS (S719, S720). The first RS can receive uplink signal quality information of the first terminal from the RNG-REQ message. The first RS transmits the uplink signal quality information of the terminal, which the first RS has obtained, via a REP-RSDetect-RSP message to the BS. If the BS requests the downlink signal quality information of the terminal directly from the terminal without involving the RS, the BS returns to the process of step S701.

A description will now be given of a method in which a BS and a terminal switch to perform direct communication with each other while performing relay communication with each other using an RS. In the case that a terminal in the coverage of an RS transmits uplink signal quality information between a BS and the terminal directly to the BS without involving the RS, the BS provides a service directly to the terminal without involving the RS if the uplink signal quality information received by the BS directly from the terminal is similar to or higher than uplink signal quality information of the terminal received by the RS.

If, while receiving a service from the BS through the RS, the terminal leaves the coverage of the RS or approaches the BS so that uplink signal quality information of the terminal received by the BS is improved or if the BS desires to transmit data directly to the terminal without involving the RS, the BS compares the uplink signal quality information received from the terminal with uplink signal quality information obtained when an RS is present between the terminal and the BS. If the uplink signal quality information between the BS and the terminal received directly from the terminal is similar to or higher than the uplink signal quality information between the BS and the terminal received through the RS, the BS provides the service directly to the terminal without involving the RS.

The following is a description of a procedure in which, while a BS and a terminal communicate directly with each other, an RS is allowed to relay signals communicated between the BS and the terminal.

If downlink signal quality information of the terminal received by the BS through the RS or uplink signal quality information measured by the downlink signal quality information is less than a reference value or if downlink/uplink signal quality information received by the BS from the terminal is higher than the reference value and is also similar to or higher than downlink/uplink signal quality information of the terminal received through the RS, the BS requests uplink signal quality information of the terminal.

In order to obtain downlink signal quality information of the terminal, the BS allocates a CQICH zone to the terminal. The BS can allocate the CQICH zone directly to the terminal and can also allocate the CQICH zone through the RS. If downlink signal quality information of each terminal included in a CQICH zone of the terminal or uplink signal quality information of the reception of the downlink signal quality information is higher than the reference value and is also higher than uplink signal quality information of the terminal received through an RS, the BS provides a service directly to the terminal without involving the RS.

Figure 8:
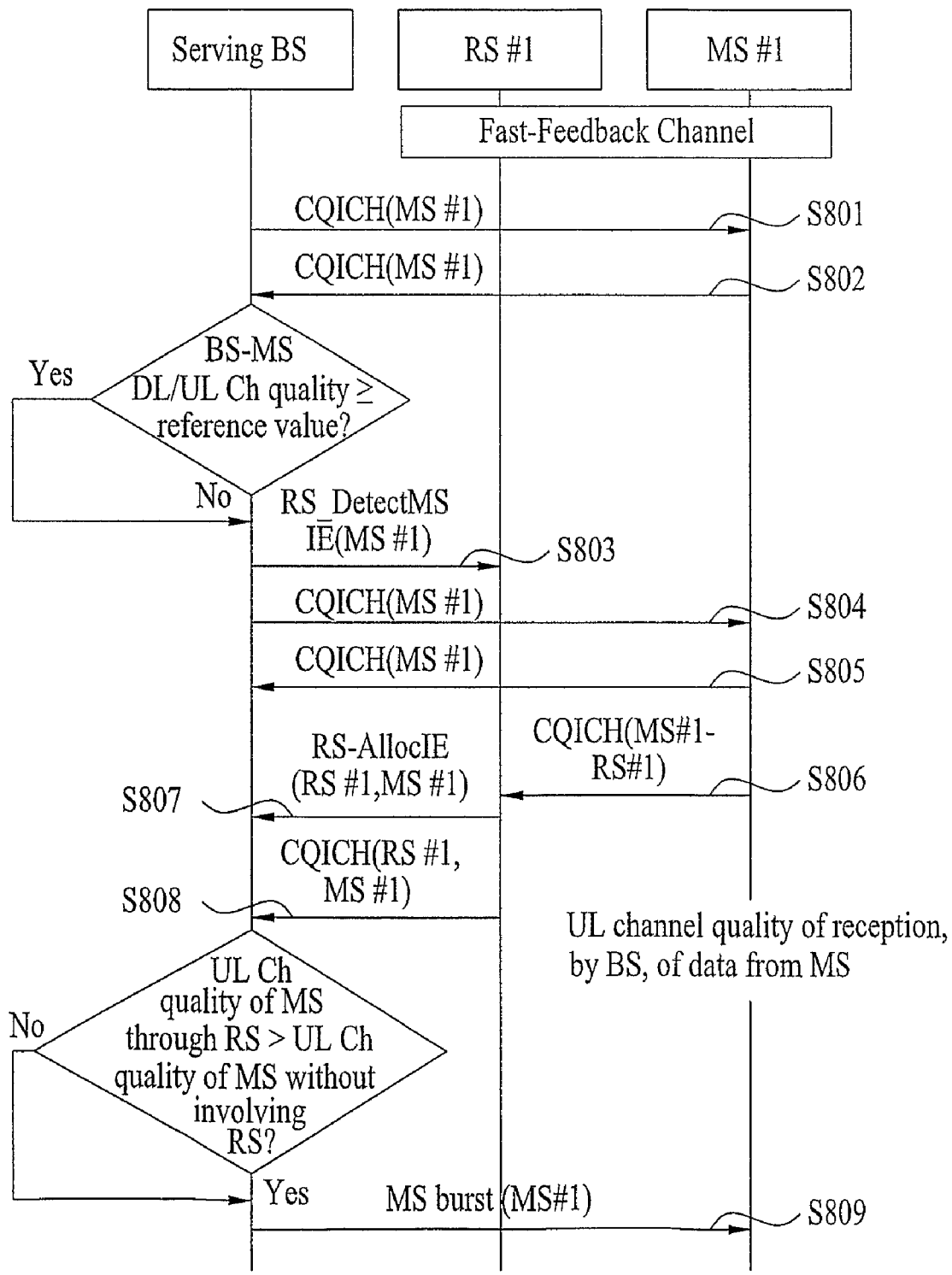
FIG. 8 is a flow chart of a method for deciding whether to perform direct communication or relay communication.

FIG. 8 is a flow chart of an embodiment of a method for deciding whether to perform direct communication or relay communication.

In the case where a BS allocates a CQICH zone for receiving downlink signal quality information of a terminal, the BS requests downlink signal quality information of the terminal (a first terminal in the example of FIG. 8) (S801). The BS checks downlink signal quality information of the terminal received by the BS or uplink signal quality information measured by the downlink signal quality information (S802). If the signal quality information is equal to or higher than a reference value, the BS requests that an RS (a first RS in the example of FIG. 8) monitor an uplink of the terminal (i.e., the first terminal) which provides the signal quality information equal to or higher than the reference value (S803) and then requests that the terminal transmit its downlink signal quality information through a CQICH allocated to the terminal (S804).

The first terminal transmits downlink signal quality information between the first terminal and the BS to the BS via the allocated CQICH (S805). The first RS receives uplink signal quality information between the first RS and the first terminal (S806). The BS allocates a CQICH zone for the first RS to allow the first RS to transmit the received uplink signal quality information of the first terminal (S807). The first RS transmits the received uplink signal quality information of the first terminal through the allocated CQICH zone of the first RS (S808). If uplink signal quality information received directly from the first terminal without involving the first RS is higher than the uplink signal quality information of the first terminal received through the first RS, the BS provides a service directly to the first terminal without involving the first RS (S809).

In order to obtain quality information of uplink signals received from the terminal, the BS allocates an uplink zone of the terminal through the RS or allocates an uplink zone directly to the terminal without involving the RS.

In the former case where the BS allocates an uplink zone of the terminal through the RS, if the terminal has data to be transmitted to the BS, the terminal transmits the data to the RS via the allocated zone and the RS then transmits the data to the BS. If the terminal has no data to be transmitted to the BS, the terminal performs periodic ranging and requests a ranging procedure through the BS. Here, the BS can obtain quality information of uplink signals of the terminal received through the RS. If the uplink signal quality information received through the RS is less than the reference value, the BS allocates an uplink resources directly to the terminal to transmit data directly to the terminal or obtains quality information of uplink signals of the terminal received from the RS through periodic ranging. If the uplink signal quality information received directly from the terminal is equal to or higher than the reference value and is also higher than the uplink signal quality information of the terminal received through the RS, the BS provides a service directly to the terminal without involving the RS.

In the latter case where the BS allocates an uplink zone directly to the terminal without involving the RS, if uplink signal quality information of the terminal obtained directly from the terminal is equal to or higher than the reference value and is also higher than uplink signal quality information of the terminal received through the RS, the BS provides a service directly to the terminal without involving the RS.

Figure 9:
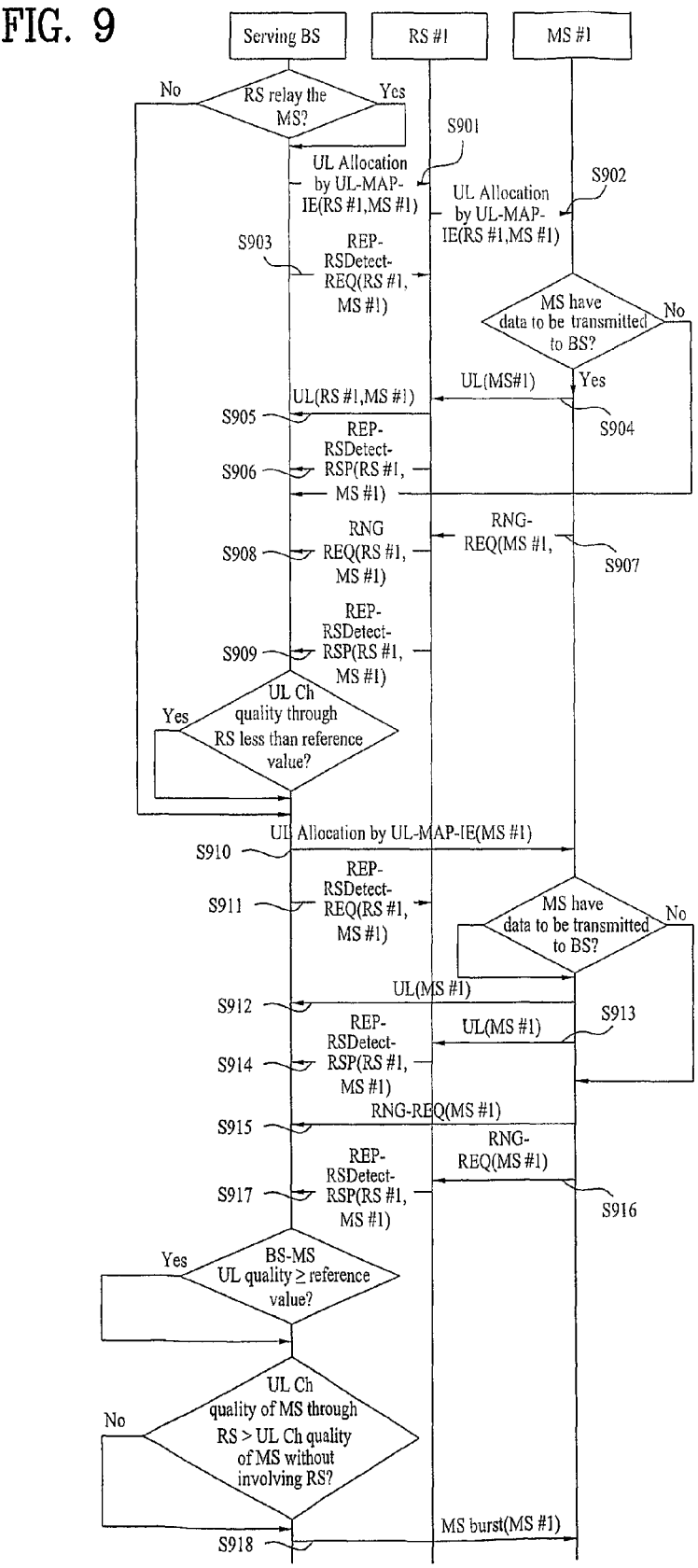
FIG. 9 is a flow chart of a method for deciding whether to perform direct communication or relay communication.

FIG. 9 is a flow chart of an embodiment of a method for deciding whether to perform direct communication or relay communication. As shown in FIG. 9, when a BS performs communication with a first terminal through a first RS, the BS allocates an uplink area of the first terminal to an uplink zone of the first RS (S901) and allocates the uplink allocation area of the first terminal through the first RS (S902). The BS transmits a REP-RSDetect-REQ message to the first RS to allow the first RS to monitor an uplink from the first terminal (S903).

If the first terminal has data to be transmitted to the BS, the first terminal transmits the data to the first RS and the first RS then transmits the data to the BS (S904, S905). Here, the first RS can obtain uplink signal quality information from the first terminal. The first RS transmits the received uplink signal quality information to the BS via a REP-RSDetect-RSP message (S906). If the first terminal has no data to be transmitted to the BS, the first terminal performs periodic ranging. To perform the periodic ranging, the first terminal transmits a RNG-REQ message to the first RS and the first RS then transmits it to the BS (S907, S908). Here, the first RS can obtain uplink signal quality information from the first terminal. The first RS transmits the received uplink signal quality information of the first terminal to the BS via a REP-RSDetect-RSP message (S909). If the uplink signal quality information of the first terminal received through the first RS (RS#1) is less than a reference value, the BS allocates uplink resources to the first terminal (S910). If the first terminal, to which the BS has allocated uplink resources, has data to be transmitted to the BS, the first terminal transmits the data via the uplink area allocated to the first terminal (S912). Here, the BS can receive uplink signal quality information from the first terminal. If the first terminal has no data to be transmitted to the BS, the first terminal transmits a RNG-REQ message to the BS. Here, the first terminal can obtain uplink signal quality information from the first terminal (S915). If the uplink signal quality information between the BS and the first terminal is equal to or higher than the reference value and is also higher than uplink signal quality information of the first terminal received through the first RS, the BS provides a service directly to the first terminal without involving the first RS (S918).

In the case that the BS communicates directly with the first terminal without involving the first RS, the BS allocates an uplink of the first terminal (S910) and the BS transmits a REP-RSDetect-REQ message to the first RS to request the first RS to monitor uplink signal quality information received from the first terminal (S911).

If the first terminal, to which the BS has allocated uplink resources, has data to be transmitted to the BS, the first terminal transmits the data via the resources allocated to the first terminal. Here, the BS can receive uplink signal quality information of the first terminal (S912). The first RS can obtain uplink signal quality information from the first terminal (S913). The first RS transmits the uplink signal quality information of the first terminal to the BS via a REP-RSDetect-RSP message (S914).

If the first terminal has no data to be transmitted to the BS, the first terminal transmits a RNG-REQ message to the BS. Here, the BS can receive uplink signal quality information of the first terminal (S915). The first RS can obtain uplink signal quality information from the first terminal. The first RS transmits the received uplink signal quality information of the first terminal to the BS via a REQ-RSDetect-RSP message (S914). If the uplink signal quality information between the BS and the first terminal is equal to or higher than the reference value and is also higher than uplink signal quality information of the first terminal received through the first RS, the BS provides a service to the first terminal without involving the first RS (S918).

The BS periodically receives uplink signal quality information from a terminal and an RS and, using this information, the BS can decide whether to perform direct communication or relay communication through the RS. Specifically, the BS periodically requests uplink signal quality information between the terminal and the RS. In order to obtain the quality information of downlink/uplink signals received from the terminal, the BS obtains uplink signal quality information of the terminal through the RS or receives uplink signal quality information directly from the terminal without involving the RS.

The present invention suggests a method in which a BS checks uplink signal quality information between the BS, a terminal, and an RS periodically or when a specific event has occurred. In this method, if an RS is present between the BS and the terminal, the BS decides whether or not to perform relay communication through the RS by comparing uplink signal quality information between the BS and the terminal with uplink signal quality information between the BS, the RS, and the terminal. Accordingly, the BS can provide a seamless service and the coverage of the BS can be increased and the service can also be provided normally even in shadow areas. In addition, the BS can perform group-based management of terminals that receive services from the BS through RSs, thereby allowing efficient resource distribution of the BS and also reducing power consumption of terminals.

Table 7 is a table of UIUC values.

TABLE 7

| UIUC | Usage |
| --- | --- |
| 0 | FAST-FEEDBACK Channel Different burst |
| 1-10 | profiles (Data Grant Burst Type) |
| 11 | Extended UIUC 2 IE |
| 12 | CDMA Bandwidth Request, CDMA Ranging |
| 13 | PAPR reduction allocation, Safety zone |
| 14 | CDMA Allocation IE |
| 15 | Extended UIUC |

Table 8 illustrates an example where the type of UIUC is 15, i.e., when an extended UIUC is selected. "Extended UIUC=OB" indicates RS-Detect-MS_IE and "Extended UIUC=OC" indicates RS-CQICH_Alloc_IE.

Table 8 is a table illustrating an example of a REP-RSDetect-RSP message.

TABLE 8

| Extended UIUC (hexadecimal) | Usage |
| --- | --- |
| 00 | Power_control_IE |
| 01 | Mini-subchannel_allocation_IE |
| 02 | AAS_UL_IE |
| 03 | CQICH_Alloc_IE |
| 04 | UL Zone IE |
| 05 | PHYMOD_UL_IE |
| 06 | MIMO_UL_Basic_IE |
| 07 | UL-MAP_Fast_Tracking_IE |
| 08 | UL_PUSC_Burst_Allocation_in_Other_Segment_IE |
| 09 | Fast_Ranging_IE |
| 0A | ULAllocation Start IE |
| 0B | RS-Detect_MS_IE |
| 0C | RS-CQICH_Alloc_IE |
| 0D-0F | Reserved |

Table 9 illustrates an example of an RS-Detect MS IE format.

TABLE 9

| Syntax | Size | Notes |
| --- | --- | --- |
| RS-Detect_MS_IE( ) { | | |
| Extended UIUC | 4 bits | CQICH = 0x0B |
| Length | 4 bits | Length of the message in bytes (variable). |
| N_CID | 7 bits | Numbers of MS Basic CIDs. |
| Fast FeedBack Channel configuration included | 1 bits | Fast FeedBack Channel |
| If(Fast FeedBack Channel configuration included ==1) { | | |
| OFDMA symbol offset | 8 bits | |
| Subchannel offset | 7 bits | |
| No. OFDMA symbols | 7 bits | |
| No. subchannels | 7 bits | |
| } | | |
| For(i=0; i<N_CID; i++){ | | |
| CID | 16 bits | MS Basic CID may be detected by RS in the current frame. |
| Frame_Num | | Frame number |
| Allocation_Offset | 6 bits | Index to the Fast Feedback channel region |
| Report type | 1 bits | 0: report for CINR 1: report for RSSI |
| } | | |
| Padding | variable | Number of bits required to align to byte length, shall be set to zero. |
| } | | |

Table 10 illustrates an example of a RS-CQICH_Alloc_IE format.

TABLE 10

| Syntax | Size | Notes |
|---|---|---|
| RS-CQICH_Alloc_IE( ) { | | |
| Extended UIUC | 4 bits | CQICH = 0x0C |
| Length | 4 bits | Length of the message in bytes (variable). |
| OFDMA symbol offset | 8 bits | |
| Subchannel offset | 7 bits | |
| No. OFDMA symbols | 7 bits | |
| No. Subchannels | 7 bits | |
| N_CID | 7 bits | Number of MS Basic CIDs |
| For(i=0; i<N_CID; i++){ | | |
| CID | | MS Basic CID |
| Quality Allocation offset | | For RS-MS quality Index to the RS-CQICH alloc channel region |
| Report type | 1 bit | 0: report for CINR<br>1: report for RSSI |
| If(report type ==0){ | | |
| Channel quality | | |
| } | | |
| Else if(report type ==1){ | | |
| Channel quality | | |
| } | | |
| } | | |
| Padding | variable | Number of bits required to align to byte length, shall be set to zero. |
| } | | |

Table 11 illustrates an example of a REP-RSDetect-REQ message.

TABLE 11

| Syntax | Size | Notes |
|---|---|---|
| REP-RSDetect_REQ( ) { | | |
| Management message Type | 8 bits | |
| N_CID | 7 bits | Number of MS Basic CIDs. |
| For(i=0; i<N_CID; i++){ | | |
| CID | 16 bits | MS Basic CID may be detected by RS in the current frame. |
| Report type | 1 bit | 0: report for CINR<br>1: report for RSSI |
| } | | |
| } | | |

Table 12 illustrates an example of a REP-RSDetect-RSP message.

TABLE 12

| Syntax | Size | Notes |
|---|---|---|
| REP-RSDetect_RSP( ) { | | |
| Management message Type | 8 bits | |
| Number of MS | 7 bits | Numbers of MSs. |
| For(i=0; i<Number of MS; i++){ | | |
| CID | 16 bits | MS CID may be detected by RS in the current frame. |
| Report type | 1 bit | 0: report for CINR<br>1: report for RSSI |
| If(report type ==0){ | | |
| Channel quality | | |
| } | | |
| Else if(report type ==1){ | | |
| Channel quality | | |
| } | | |
| } | | |
| } | | |

Second Embodiment

A second embodiment of the present invention includes an example of a method for reporting a channel status in a system including an RS. The second embodiment will now be described with reference to the accompanying drawings.

An embodiment of the present invention relates to a terminal which communicates with a base station (BS) through a relay station (RS). The BS is a node which is connected to the backbone network to communicate with the RS and the terminal. The RS is a node which communicates with the BS. Preferably, the RS communicates data wirelessly with the BS. More preferably, the RS communicates with the BS according to an OFDM/OFDMA scheme. The RS performs relaying between the BS and the terminal. The term "relaying" refers to a series of communication processes of receiving data destined for the terminal from the BS and transmitting it to the terminal and receiving data destined for the BS from the terminal and transmitting it to the BS. Preferably, the relaying is performed according to the OFDM/OFDMA scheme as described above. Preferably, the relaying is performed according to a variety of communication schemes such that data encoded according to a first scheme is received and decoded and the decoded data is encoded according to the first scheme or a second scheme and the encoded data is then transmitted to the BS. The relaying may include a process of amplifying and transmitting/receiving communication data signals of the terminal. The relaying may also include a process of attaching additional data to data received from the terminal and then transmitting it to the BS or a process of transforming and transmitting data received from the terminal to the BS. The RS is connected to the BS. There is no limit on the number of RSs. The terminal is a node that is connected to the BS or the RS and may be a mobile terminal that is movable or a stationary terminal that is fixed to a specific position.

In an embodiment of the present invention, the RS requests the BS to measure a channel quality when a specific event has occurred. Specifically, this embodiment provides a mechanism ensuring that, when a terminal in the coverage of the BS receives a communication service from the BS through the RS, the RS reports a channel status between the RS and the terminal to the BS. This embodiment also provides a method for relaying a service, which has been relayed through a first specific RS, through a second specific RS.

The RS requests the BS to measure the channel quality as described above. The channel quality request is made by an RS (hereinafter referred to as a first RS) which currently performs relaying for the terminal. The channel quality may be a channel quality between the BS and an RS (hereinafter referred to as a second RS) other than the first RS or a channel quality between the BS and the terminal. The channel quality indicates a channel status between specific nodes and, for example, the quality of signals transmitted through an uplink or the quality of signals transmitted through a downlink. The channel quality can be measured according to a variety of methods. For example, a specific channel to be subjected to channel quality measurement is set and the set channel is then monitored to measure its quality. In another method, the quality of a downlink may be measured by transmitting a message requesting to measure the quality of the downlink to the terminal and then demodulating a message received from the terminal to measure the quality of the downlink. In this case, the quality of the uplink may be measured using a message reporting the downlink quality.

According to this embodiment, the first RS requests the BS to measure the channel quality when a specific event has occurred as described above. To make this request, the first RS may transmit information regarding a specific terminal that is in a poor connection state and may transmit a channel status between the first RS and the specific terminal and may also transmit a message requesting the BS to measure the channel quality. After receiving the channel quality measurement request message, the BS may measure a channel quality between the first RS and the BS or may measure a channel quality between the terminal and the BS. For example, when an event occurs as a quality level regarding an uplink signal quality between the first RS and a terminal is reduced below a reference value, the first RS reports the terminal, whose uplink signal quality information has been reduced below the reference value, to the BS. The term "signal quality information" refers to information (or value) regarding the signal quality such as CINR or RSSI information (or value). After receiving the report from the first RS, the BS may request uplink signal quality information between the terminal and an RS (for example, the second RS) adjacent to the first RS or may request information regarding the quality of direct uplink/downlink signals between the BS and the terminal.

According to this embodiment, the first RS may provide information regarding a second RS which relays signals of the terminal to the BS when a specific event has occurred. Specifically, when an event such as a reduction in the channel quality between the first RS and the terminal has occurred, the first RS can propose a candidate RS that can relay the terminal. Through this operation, the first RS can assist the BS in measuring the channel quality. To propose the candidate RS, it is necessary for the first RS to have information regarding RSs located around the first RS. Accordingly, it is preferable that the BS provide information regarding neighbor RSs located around the first RS to the first RS. Preferably, the information regarding RSs located around the first RS is broadcasted. More preferably, the RS information is repeatedly broadcasted at regular or irregular intervals. More preferably, the neighbor RS information is information regarding at least one RS. Upon the proposal of the candidate RS, the BS may preferentially measure the channel quality of the candidate RS. According to this embodiment, the first RS may request the BS to preferentially measure the channel quality with the terminal. If the first RS requests the BS to measure a channel quality between the terminal and the BS, the BS measures the channel quality between the terminal and the BS. On the other hand, if the first RS requests the BS to measure a channel quality between the terminal and the second RS, the BS measures the channel quality between the terminal and the second RS.

According to the present invention, the BS preferably measures the channel quality according to the request of the first RS and decides, based on the channel quality measurement results, whether to allow the second RS to perform relaying for the terminal, to allow the first RS to continue relaying for the terminal, or to communicate directly with the terminal. For example, the BS can select one of the first and second RSs, which provides uplink signal quality information that is equal to or higher than the reference value and that is also higher than that of the other RS, by comparing the uplink signal quality information between the second RS and the terminal with the uplink signal quality information between the first RS and the terminal. In addition, if the channel quality between the terminal and the BS is measured to be equal to or higher than a specific threshold or to be higher than the channel quality between the RS and the terminal, the BS may communicate directly with the terminal without involving the RS. In a method of deciding whether or not to communicate directly with the terminal, the BS may use the conventional CQICH channel and REP-REQ/RSP MAC management message for the decision.

The RS may obtain the channel quality information between the RS and the terminal when the BS requests the RS to obtain. The RS may also previously obtain the channel quality information before the BS makes the request and then immediately report it to the BS upon the request of the BS.

The procedure of this embodiment is activated when a specific event has occurred as described above. The event may occur when the channel quality between the first RS and the terminal is reduced below a specific threshold. The event may be repeated at predetermined time intervals and may also be repeated at irregular time intervals. The event may occur by a control message or the like from a backbone network which controls the BS.

Examples in which the first RS requests the channel quality of the terminal from the BS when the terminal is present in the coverage of the BS will now be described.

(1) Example in which BS switches to communicate directly with terminal (MS) while communicating with terminal through RS:

If the terminal leaves the coverage of the first RS to move to another area in the coverage of the BS while receiving a service from the BS through the first RS, a quality level regarding the uplink signal quality between the first RS and the terminal is reduced. The first RS then requests the BS to obtain information regarding a direct uplink signal quality between the BS and the terminal. After receiving the uplink signal quality information from the terminal, the BS communicates directly with the terminal without involving the RS if the direct communication with the terminal is better.

(2) Example in which, while performing relaying for terminal through one RS, BS performs handover to adjacent RS:

If the terminal enters the coverage of the second RS adjacent to the first RS while receiving a service from the BS through the first RS, a quality level regarding the uplink signal quality between the first RS and the terminal is reduced. The first RS then requests the BS to obtain information regarding an uplink signal quality between the second RS and the terminal. After receiving the uplink signal quality information between the second RS and the terminal, the BS selects and allows one of the first and second RSs, which provides a higher quality, to perform relaying.

This embodiment suggests a process in which the first RS reports information of the terminal to the BS when a quality level regarding the uplink signal quality between the first RS and the terminal is reduced below a reference value, so that the BS can select an appropriate RS in the coverage of the BS and decide whether or not to communicate directly with the terminal and it is also possible to increase the throughput and to ensure a seamless service.

Figure 10:
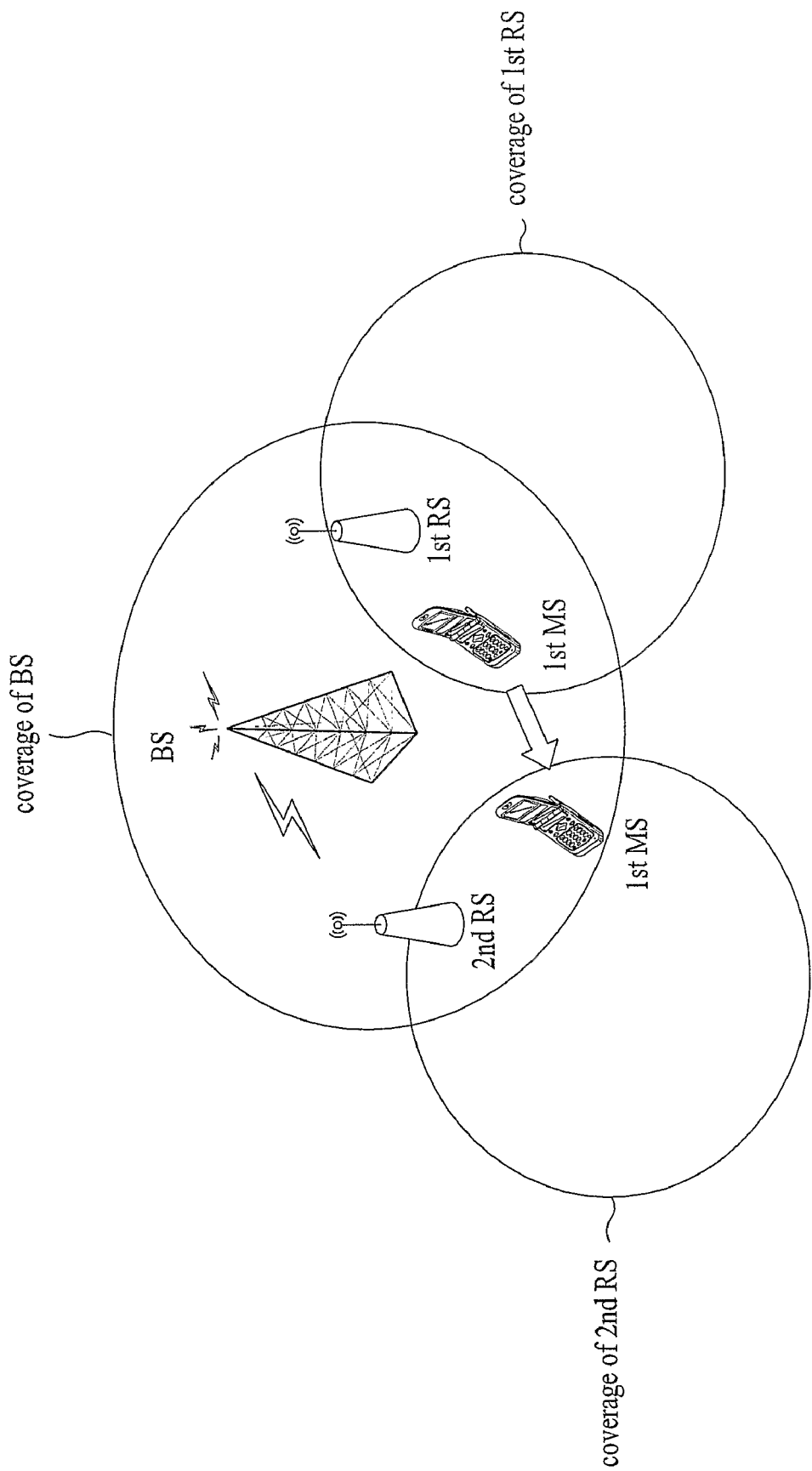
FIG. 10 illustrates an example of a communication system for implementing an embodiment of the present invention.
Figure 11:
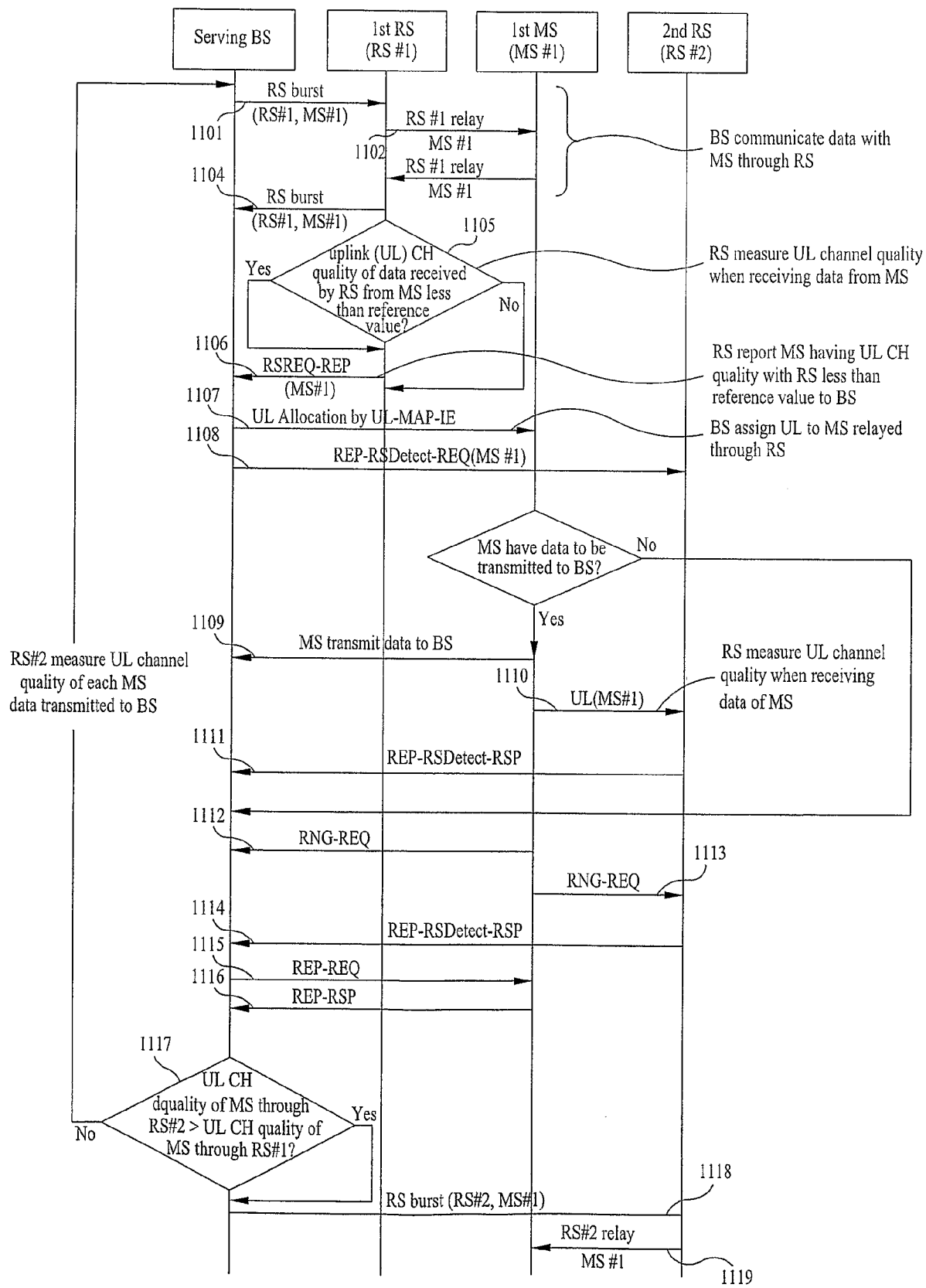
FIG. 11 is a process flow diagram according to the embodiment of the present invention.

FIG. 10 is an example of a communication system for implementing an embodiment of the present invention. FIG. 11 is a process flow diagram according to the embodiment of the present invention. How the communication system operates according to this embodiment of the present invention will now be described with reference to FIGS. 10 and 11. The example of FIG. 11 suggests a method for the first RS reporting to the BS using an RS-REPORT MAC management message according to this embodiment.

The communication system of FIG. 10 includes one BS and two RSs (first and second RSs) and also includes at least one terminal (first terminal) which communicates with the first or second RS or the BS. When the first terminal communicates with the BS through the first RS, a channel status between the first terminal and the first RS may be worsened below a reference value as the first terminal moves to the coverage of the second RS while receiving a service from the BS through the first RS. In this case, the first RS reports to the BS. This reporting may include transmitting a REP-REQ MAC message from the first RS to the BS. When receiving the REP-REQ MAC message, the BS may obtain a channel status between the first terminal and the BS and a channel status between the second RS and the terminal.

The process flow diagram of FIG. 11 will now be described. The example of FIG. 11 can be applied when the first terminal leaves the coverage of the first RS and enters the coverage of the second RS.

The BS which communicates with the terminal will now be referred to as a serving BS. The serving BS communicates with the terminal using the first RS (S1101-S1104). That is, the first RS can relay data for the first terminal. Specifically, the serving BS transmits data to the first RS (S1101) and the first RS then transmits the data to the first terminal (S1102). Consequently, the first terminal receives a service from the serving BS. The first terminal transmits data to the first RS (S1103) and the first RS then transmits the data to the serving BS (S1104).

If the first RS relays data in the above manner, the first RS can measure a channel quality between the first terminal and the first RS. The channel quality can be repeatedly measured at irregular time intervals and can also be measured by a control signal from an external node such as a BS or a backbone network. When the channel quality is measured, the RS checks whether or not the measured channel quality has been reduced below a specific reference value (S1105). An uplink channel quality is checked as an example of the channel quality in the embodiment of FIG. 11.

When the channel quality is less than the reference value, the first RS transmits a report message to the serving BS (S1106). The embodiment of FIG. 11 uses an RS-REPORT MAC management message as the report message. The report message includes a variety of information. In the embodiment of FIG. 11, the report message includes information regarding the channel quality between the first RS and the first terminal.

If a channel quality regarding the uplink signal quality of the first terminal received by the first RS (i.e., information regarding the uplink signal quality between the first terminal and the first RS) is less than the reference value, the first RS may obtain information regarding the uplink signal quality between the first terminal and another RS (for example, the second RS) adjacent to the first terminal in the serving BS. The serving BS may also obtain information regarding the channel quality between the first terminal and the serving BS.

The serving BS assigns uplink resources to the first terminal if the uplink signal quality reported from the first RS is less than the reference value (S1107).

The serving BS transmits a REP-RSDetect-REQ message, which contains a request of the first RS requesting that the uplink of the first terminal be monitored, to the second RS (S1108).

If the first terminal has data to be transmitted to the serving BS after the serving BS assigns the uplink resources to the first terminal at step S1107, the first terminal transmits the data to the serving BS through the assigned uplink resources (S1109). When the first terminal transmits data to the serving BS, the second RS checks uplink signal quality information of the data received from the first terminal (S1110). The second RS transmits the uplink signal quality information via a REP-RSDetect-RSP message, which is a response to the uplink monitoring request message (REP-RSDetect-REQ), and transmits the REP-RSDetect-RSP message to the serving BS (S1111).

If the first terminal has no data to be transmitted to the serving BS after the serving BS assigns the uplink to the first terminal at step S1107, the first terminal performs periodic ranging. When the first terminal performs periodic ranging, the first terminal transmits an RNG-REQ message to the serving BS (S1112). When the second RS receives the RNG-REQ message from the first terminal, the second RS can check the uplink signal quality information of the first terminal (S1113). The second RS transmits the received signal quality information of the first terminal through a REP-RS-Detect-RSP message to the serving BS (S1114).

The serving BS may request the channel state information directly from the first terminal without involving the RS. In this case, the serving BS requests uplink signal quality information of the first terminal by transmitting a conventional REP-REQ message to the first terminal. When the first terminal receives a REP-RSP message from the serving BS (S1115), the first terminal transmits information regarding the uplink signal quality between the serving BS and the first terminal to the serving BS through a REP-RSP message (S1116). At step S1116, the serving BS can also obtain information regarding the signal quality of downlink and uplink channels present in the cell area between the serving BS and the first terminal.

After receiving the REP-RSDetect-RSP message from at least one RS other than the first RS, the serving BS compares the uplink signal quality information of the first terminal transmitted from the first RS with uplink signal quality information included in the REP-RSDetect-RSP message (S1117). Based on the comparison, the serving BS selects a specific RS, which provides uplink signal quality information that is equal to or higher than the reference value and that is also higher than that of other RSs, or decides whether or not to communicate directly with the first terminal. For example, when the channel quality between the second RS and the first terminal is equal to or higher than the reference value and the channel quality is also the highest, the serving BS may allows the second RS to perform relaying. In this case, the second RS performs relaying (S1118 and S1119).

Table 13 illustrates an example of the RS-REPORT MAC management message used in the embodiment of FIG. 11.

TABLE 13

| Syntax | Size | Notes |
|---|---|---|
| RSREP-REQ( ) { | | |
| Management message Type | 8 bits | |
| Number of MS | 7 bits | Numbers of MSs. |
| For(i=0; i<Number of MS; i++){ | | |
| CID | 16 bits | MS CID may be detected by RS in the current frame. |
| Report type | 1 bit | 0: report for CINR<br>1: report for RSSI |
| If(report type ==0){ | | |
| Channel quality | | |
| } | | |
| Else if (report typye ==1){ | | |
| Channel quality | | |
| } | | |
| } | | |
| } | | |

The first RS can transmit CINR or RSSI information to the serving BS by transmitting the message of Table 13 containing the CINR or RSSI information to the serving BS. The CINR or RSSI is only an example of a parameter indicating the channel quality and the message may contain other types of parameters. The RS-REPORT MAC management message of Table 13 is an example of a message reporting information regarding the first terminal and the channel quality between the first terminal and the first RS and the message of Table 13 may contain other information. The first RS can help the serving BS check the channel quality by transmitting information regarding the second RS to the serving BS as described above and the message of Table 13 may also contain information regarding RSs located around the first RS. In addition, the first RS may request the serving BS to preferentially check the channel quality for the first terminal as described above. The priority regarding the channel quality checking may be included in the message of Table 13. For example, the priority order may be set so that the serving BS first checks a channel quality for direct communication with the terminal and then checks a channel quality for relaying through the RS.

The present invention provides a method for reporting a channel status in a communication system including a relay station, which has a variety of advantages.

For example, a base station (BS) decides whether to perform direct communication or relay communication with a terminal and controls the communication in a broadband wireless access system, thereby increasing the throughput.

The present invention also suggests a method in which a relay station (RS) reports information regarding the uplink signal quality between a mobile terminal and the RS to a BS. When an RS is provided between the BS and a mobile terminal, this method allows the BS to efficiently decide whether or not to allow the RS to perform relaying for the terminal. Accordingly, the BS can provide a seamless service and the coverage of the BS can be increased and the service can also be provided normally even in shadow areas. In addition, the BS can perform group-based management of mobile terminals that receive services from the BS through RSs, thereby allowing efficient resource distribution of the BS and also reducing power consumption of mobile terminals.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A relay communication control method, the method comprising:
    transmitting, by a base station (BS), an uplink MAP message to allocate an uplink channel to a mobile station (MS);
    receiving, by the BS, a ranging request message during a ranging procedure;
    obtaining, by the BS, first information regarding a channel condition between the BS and the MS based on a transmission status of the ranging request message;
    transmitting, by the BS, a report request message to request information of a channel condition between the a relay station (RS) and the MS;
    receiving, by the BS, a report response message in response to the report request message, the report response message comprising second information regarding the channel condition between the RS and the MS;
    comparing the first information to the second information in order to compare the channel condition between the BS and the MS with the channel condition between the RS and the MS; and
    performing direct communication with the MS or relay communication with the RS according to a result of the comparison,
    wherein the second information is acquired by monitoring the uplink channel allocated to the MS.

2. The method of claim 1, wherein the direct communication is performed when the channel condition between the BS and the MS is better than the channel condition between the RS and the MS, and wherein the relay communication is performed when the channel condition between the RS and the MS is better than the channel condition between the BS and the MS.

3. The relay communication control method according to claim 1, wherein the first information is determined by the BS, and wherein the ranging request message is transmitted according to a ranging method indicated by the uplink MAP message.

4. The relay communication control method according to claim 3, wherein the ranging request message is transmitted during the ranging procedure.

5. The relay communication control method according to claim 1, wherein the second information comprises a Carrier to Interface Ratio (CINR) or a Received Signal Strength Indication (RSSI).

* * * * *